(12) United States Patent
Sekiguchi

(10) Patent No.: US 6,398,505 B1
(45) Date of Patent: Jun. 4, 2002

(54) COOLING APPARATUS AND COOLING SYSTEM FOR REALIZING EFFICIENT COOLING

(75) Inventor: Takashi Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/585,875

(22) Filed: Jun. 1, 2000

(30) Foreign Application Priority Data

Jun. 3, 1999 (JP) .......................................... 11-156975

(51) Int. Cl.[7] .............................................. F04B 41/06
(52) U.S. Cl. .......................................... 417/2; 361/695
(58) Field of Search ..................... 236/78 B; 361/695, 361/696, 697; 417/2, 3, 44.1, 426, 423.5

(56) References Cited

U.S. PATENT DOCUMENTS

| | | | | |
|---|---|---|---|---|
| 3,332,621 A | * | 7/1967 | Tanner .......................... | 417/2 |
| 5,484,012 A | * | 1/1996 | Hiratsuka .................... | 361/695 |
| 5,726,874 A | * | 3/1998 | Liang .......................... | 361/695 |
| 6,247,898 B1 | * | 6/2001 | Henderson et al. ............ | 417/3 |
| 6,259,172 B1 | * | 7/2001 | Lee ............................. | 361/695 |

FOREIGN PATENT DOCUMENTS

JP          10-131866          5/1998

* cited by examiner

*Primary Examiner*—Michael Koczo
(74) *Attorney, Agent, or Firm*—Katten Muchin Zavis Rosenman

(57) ABSTRACT

A cooling apparatus includes a plurality of fan units having a fan respectively, a plurality of temperature sensors detecting temperature of an object of cooling, included in the fan units respectively, and a control portion deciding the speed of the fan according to the temperature detected by the temperature sensors in a self-control mode and increasing the speed of at least one of the other fans when the speed of any one of the fans is lower than a prescribed threshold in a coordinative control mode.

15 Claims, 26 Drawing Sheets

F I G. 1 8
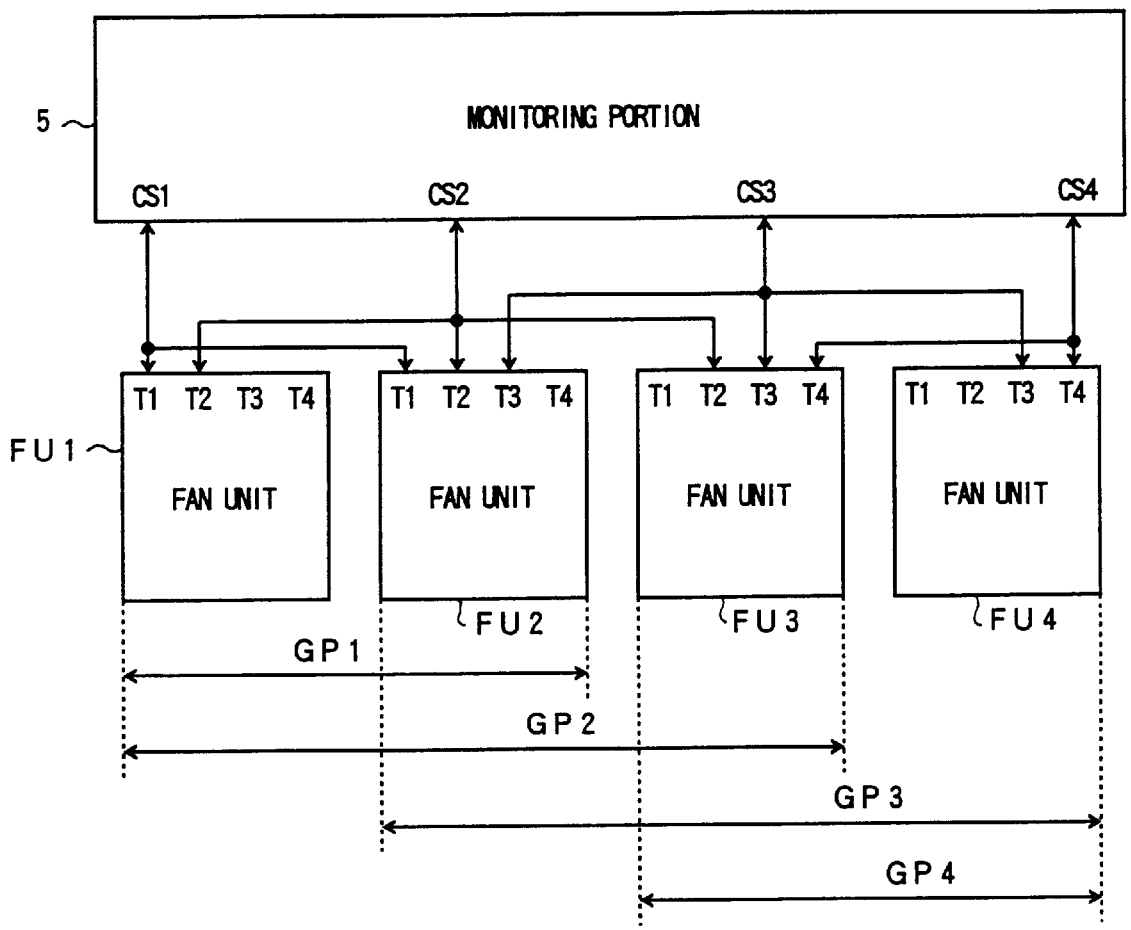

COOLING APPARATUS AND COOLING SYSTEM FOR REALIZING EFFICIENT COOLING

BACKGROUND OF THE INVENTION

1. Field of the Invention

The present invention relates to cooling apparatuses and in particular to cooling apparatuses for cooling an object by a plurality of fans.

2. Description of the Related Art

On an electronic communication apparatus, a countermeasure for the thermal stress (overheating) of electronic parts is very important not only in an aspect of preventing breakdown but also in an aspect of fire protection.

A cooling apparatus that utilizes a fan, which is the most used countermeasure for thermal stress at the present time, is very effective from ease of use and cost perspectives. Accordingly, it seems that a cooling apparatus utilizing a fan will continue to be the most used for the present.

On the other hand, high performance of communication apparatuses realized by current progress such as improvements of capacity and speed causes an increase in consumption of electric power. In addition, high-density mounting or miniaturization causes an increase of thermal stress on electronic parts.

Under such circumstances, the above cooling apparatus is even more indispensable as a cooling means. Here, it is important how to use a plurality of fans systematically as well as to make the fans high-performance. In addition, it is also important to improve the reliability of the cooling apparatuses and to decrease the costs.

However, a countermeasure to increase power of the fans is adopted in conventional designs of cooling systems for communication apparatuses. A characteristic and a reliability to withstand maximum calorific value (heat load) of the communication apparatuses are used in the selection of the fans in the above designs. Therefore, a plurality of fans selected on the basis of the characteristic and the reliability regarding heat load are used in the cooling system.

Then, in conventional cooling systems, excess speed of the fan is common since the fan is always driven under a maximum-power state regardless of the current heat load on the communication apparatus.

On the other hand, a conventional way to improve the cooling ability by increasing the speed of the fan causes various problems and has a limit for satisfying a requirement to improve the cooling performance in communication apparatuses incorporating recent technology innovations.

Namely, increased fan speed causes noise and sometimes breaks the limit of international standards. In addition, since fans are selected on the basis of maximum heat load of the communication apparatus and driven excessively under some heat load conditions, the reliability of the fans is due to the fan reaching a higher speed earlier in its life.

On the other hand, the decrease of air resistance to airflow is important for the efficient cooling operation of the fan.

FIG. 1 is a diagram showing a configuration of a conventional cooling system with heat shielding boards 71. It is noted that FIG. 1(a) is a front view of the cooling system and FIG. 1(b) is a side view thereof. As shown in FIG. 1, the fans 70a, 70b, 70c are arranged above the first, the second, and the third objects of cooling 72, 73, 74 respectively. Hereupon, the cooling system includes the first cooling apparatus with the fan 70a, the second cooling apparatus with the fan 70b, and the third cooling apparatus with the fan 70c. In addition, the system includes heat-shielding boards 71 between the adjacent cooling apparatuses.

The heat shielding boards 71 are used mainly to shield an object from the heat generated by another object. Thus, the cooling ability of each cooling apparatus can be kept independent from one another by the heat shielding boards 71.

However, the direction of the airflow, as indicated by the arrow in the FIG. 1, needs to be changed by 90°. As the result, the heat shielding boards 71 need to have a height of more than 10 centimeters to effect cooling efficiently and to reduce noise of the cooling. Furthermore, the number of the heat shielding boards 71 increases according to the increasing number of the cooling apparatuses. Therefore, there is a problem that the cooling system becomes larger than desired.

SUMMARY OF THE INVENTION

It is a general object of the present invention to provide a novel and useful cooling apparatus and a system with the apparatuses wherein the foregoing problems are eliminated.

A more specific object of the present invention is to provide a cooling apparatus having a plurality of fans and a system with the apparatuses for realizing improvement of cooling reliability and efficiency.

The above objects of the present invention are achieved by a cooling apparatus including a plurality of fan units each having a fan, a plurality of temperature sensors detecting the temperature of an object being cooled by the fan units, and a control portion deciding the speed of the fan according to the temperature detected by the temperature sensors in a self-control mode and increasing the speed of at least one of the other fans when the speed of any one of the fans is lower than a prescribed threshold in a coordinative control mode.

In another aspect of the present invention, the above objects are achieved by a cooling system including a first fan for supplying air to an object, a second fan for exhausting the air that takes heat from the object, being arranged in the opposite direction as the first fan is from the object, and an adjusting portion for adjusting a flow of the air between the first fan and the second fan.

According to the present invention, the cooling apparatus can have a longer life-span by controlling the speed of the fan according to the temperature detected by the temperature sensor in a self-control mode. Furthermore, the present invention can efficiently maintain cooling ability by increasing the speed of at least one of the other fans when any one of the fans becomes out of order in a coordinative control mode. In addition, the present invention can make its maintenance easier by enabling changes for a fan unit since each fan is mounted in a fan unit and controlled independently.

According to another aspect of the present invention, the cooling system can drive the fans efficiently and realize a high density mounting of the fans.

Other objects and further features of the present invention will become apparent from the following detailed description when read in conjunction with the attached drawings.

BRIEF DESCRIPTION OF THE DRAWINGS

FIG. 18 is a diagram showing a configuration for realizing the coordinative control by a composed control group;

DESCRIPTION OF THE PREFERRED EMBODIMENTS

Figure 1:
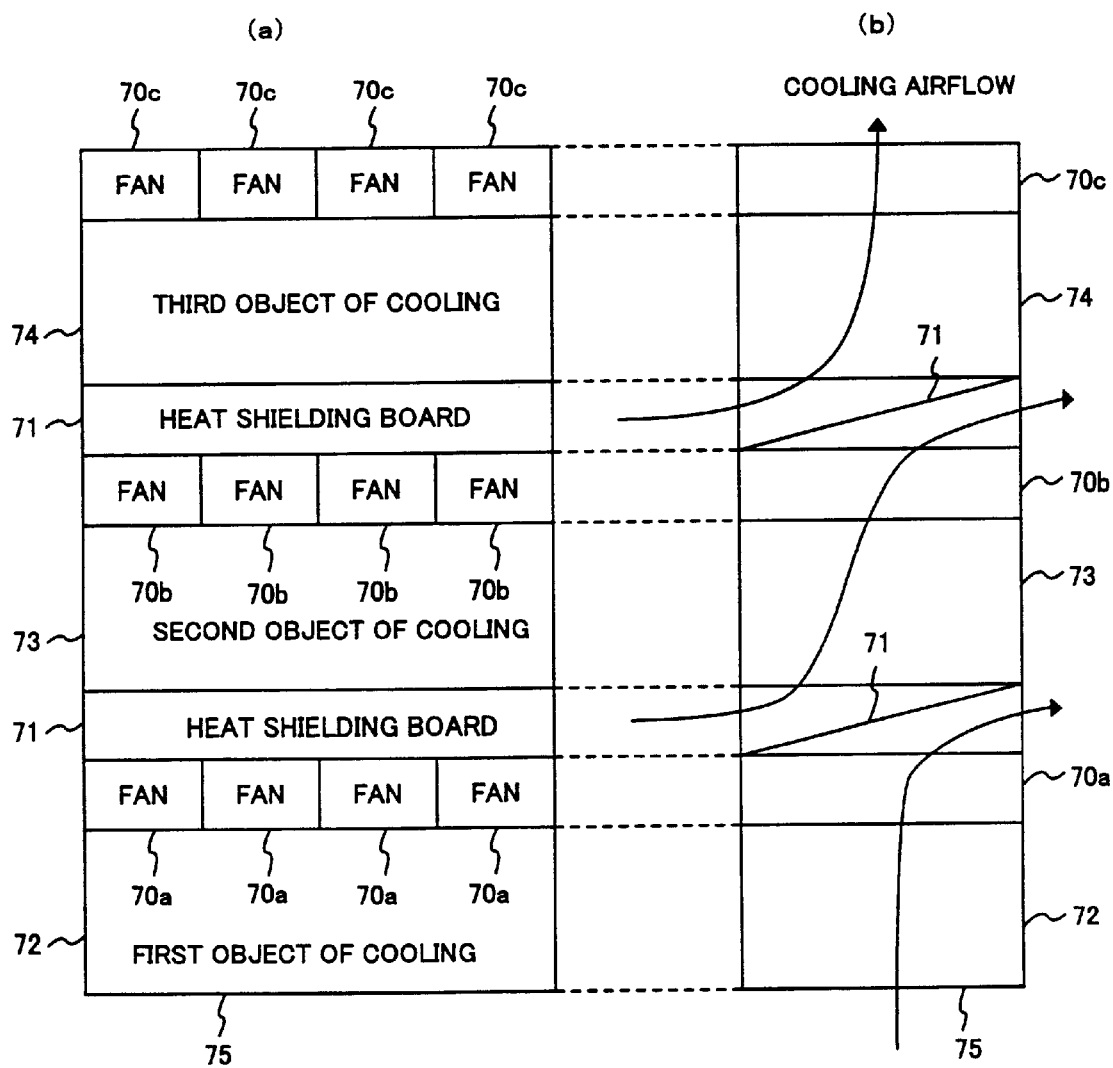
FIG. 1 is a diagram showing a configuration of a conventional cooling system with heat shielding boards.

Hereinafter, cooling apparatuses according to embodiments of the present invention will be described with reference to the drawings. It should be noted that identical marks in the drawings indicate an identical or equivalent part.

[First Embodiment]

Figure 2:
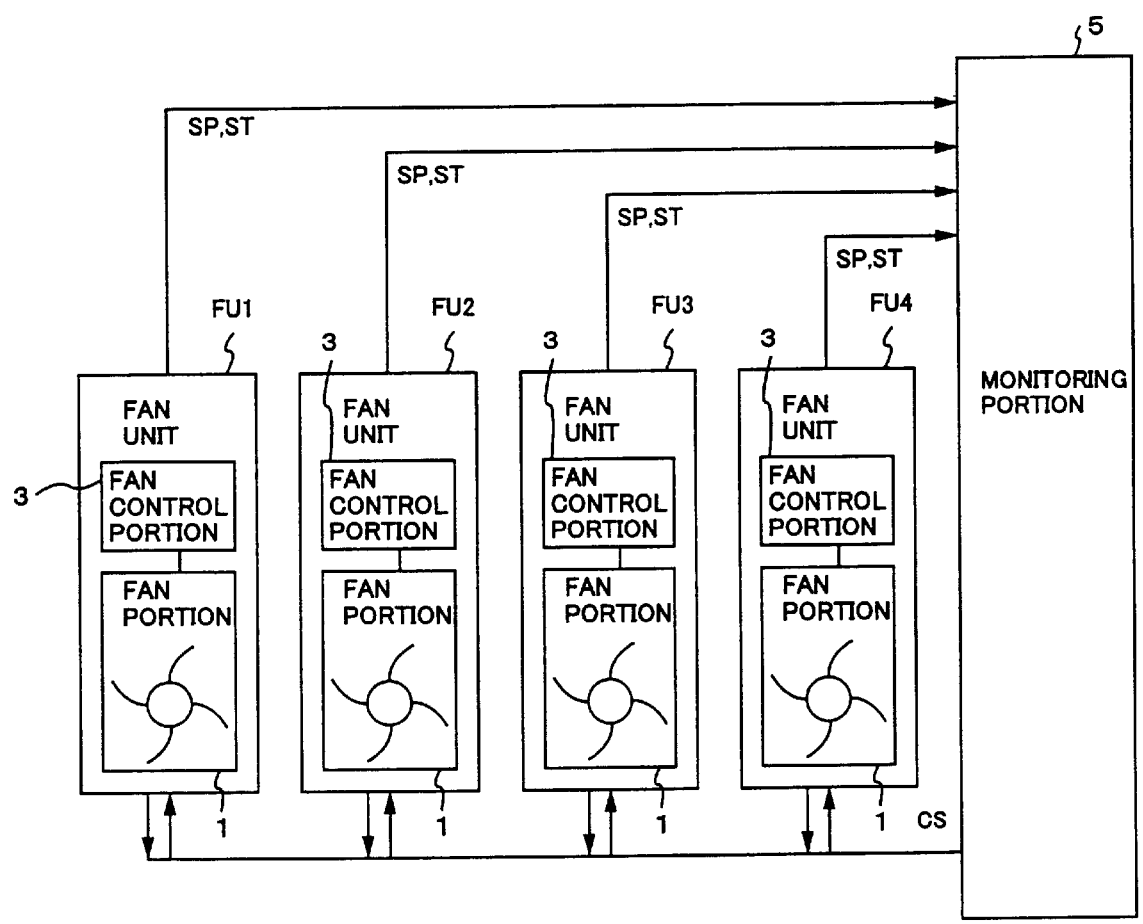
FIG. 2 is a diagram showing a configuration of a cooling apparatus according to a first embodiment of the present invention.

FIG. 2 is a diagram showing a configuration of a cooling apparatus according to a first embodiment of the present invention. As shown in FIG. 2, the cooling apparatus includes a monitoring portion 5 and four fan units FU1–FU4 connected to the monitoring portion 5. Each of the fan units FU1–FU4 includes a fan portion 1 with a fan and a fan control portion 3 connected to the fan portion 1. In addition, the fan units FU1–FU4 output and input a control signal CS to/from the monitoring portion 5 respectively. Furthermore, each of the fan units FU1–FU4 supplies fan-operating information SP to indicate an operational state of the fan and internal temperature information ST to indicate temperature of an object of cooling.

Figure 3:
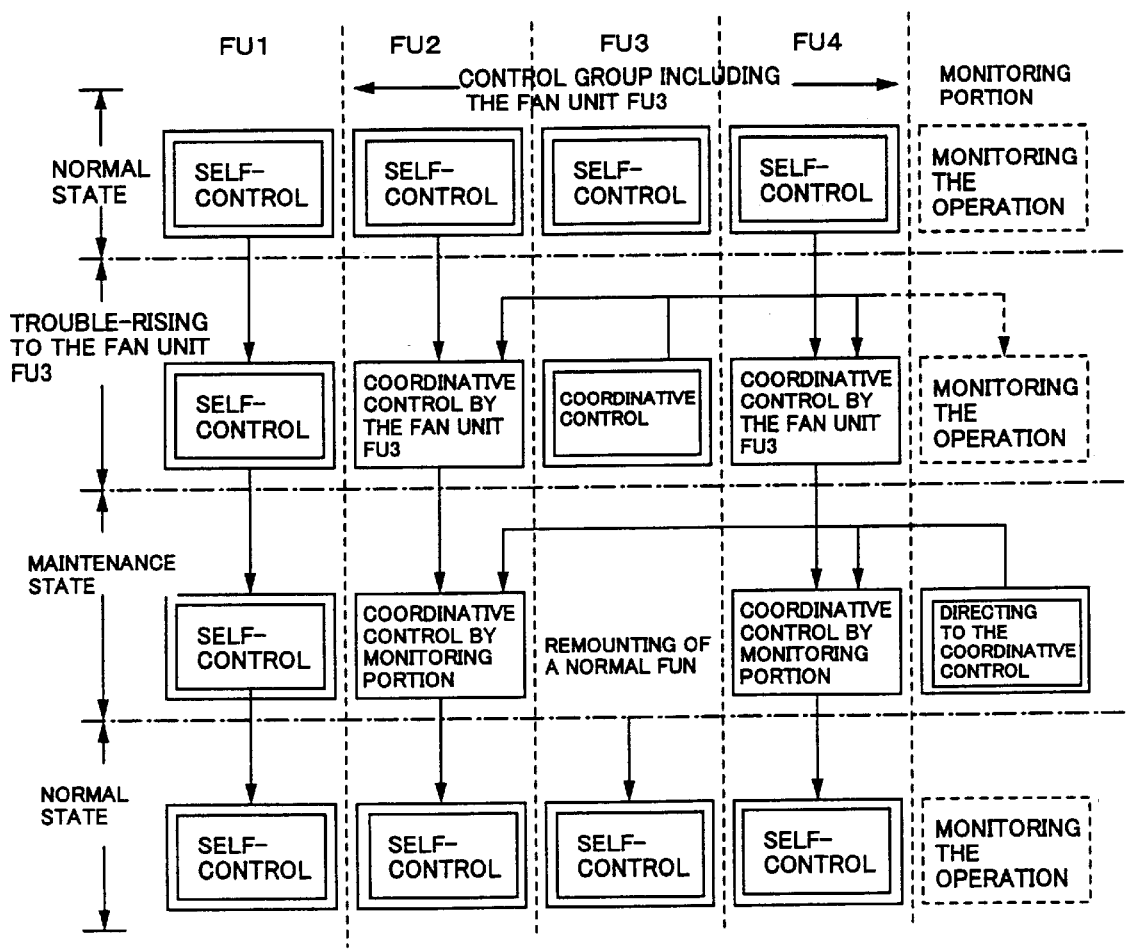
FIG. 3 is a diagram showing an operation of the cooling apparatus shown in FIG. 2.

Next, an outline of an operation on the. cooling apparatus shown in FIG. 2 is described with reference to FIG. 3. It should be noted that frames with a dashed line indicate monitor states, frames with a double line indicate master control states, and frames with a line indicate slave control states. Each of the fan units FU1–FU4 has a self-control mode and a coordinative control mode. Hereupon, the monitoring portion 5 supplies the control signal CS directing the self-control mode to the fan units FU1–FU4 under a normal state, where the monitoring portion 5 does not find any troubles on the fan units FU1–FU4.

Therefore, all the fan units FU1–FU4 enter into the self-control mode. In this self-control mode, each of the fan units FU1–FU4 detects temperature.of the object of cooling independently and controls the speed of the fan in the fan unit according to the detected temperature. By this way, every fan can avoid being driven at an excessive speed.

On the other hand, under a trouble state, for example where the fan in the fan unit FU3 becomes out of order, the monitoring portion 5 supplies the control signal CS directing the coordinative control mode to the fan units FU2, FU4 belonging to a control group predetermined by the monitoring portion 5. It should be noted that the fan unit FU3 enters into the coordinative control mode by detecting a state of its own self. Hence, it is prevented from decreasing the cooling power on. the whole cooling apparatus by reason of the trouble on the fan unit FU3.

In addition, under a maintenance state, for example where the fan unit FU3 with a problem is removed for substitution, before the removal the coordinative control state on the fan units FU2, FU4 is maintained according to the control signal CS from the monitoring portion 5.

Then, under a normal state, for example where a new fan unit is mounted as a substitute for the fan unit FU3 with a problem, the monitoring portion 5 cancels the coordinative control mode on the fan units FU2, FU4 and sets the self-control mode to the fan units FU2–FU4 again.

Figure 4:
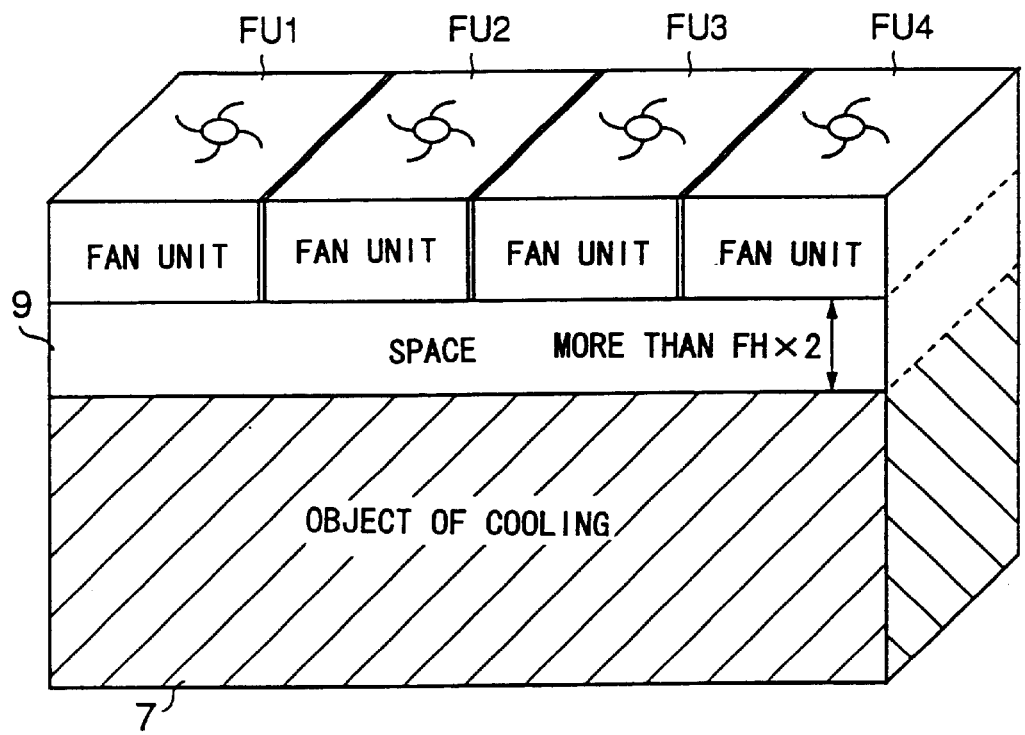
FIG. 4 is a perspective drawing showing a configuration of the cooling apparatus mounted on an object of cooling according to the first embodiment of the present invention.

FIG. 4 is a perspective drawing showing a configuration of the cooling apparatus mounted on an object of cooling 7 according to the first embodiment of the present invention. As shown in FIG. 4, the fan units FU1–FU4 are mounted over the object of cooling 7 and heat emitted from the object of cooling 7 is removed by fan units FU1–FU4. It should be noted that such a cooling system is called a blow-type cooling system.

Hereupon, each of fan units FU1–FU4 operates independently in physical and electrical aspects and has a shape like a cassette. Therefore, if any trouble, such as decrease of the speed of the fan, occurs in any one of the fan units FU1–FU4, it is enough to exchange only the fan unit. As the result, a unit of maintenance can be minimized and life cycle costs of the cooling apparatus can be decreased. Furthermore, decrease of the cooling power can be minimized in the case that any fan unit with trouble is removed.

Figure 5:
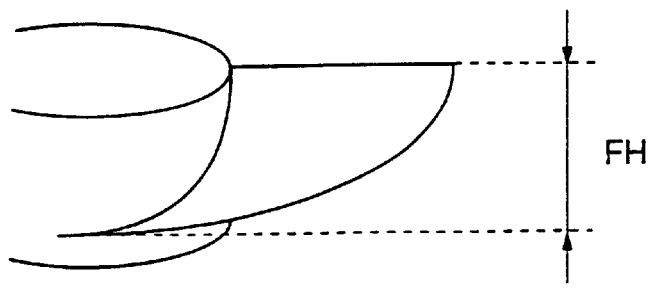
FIG. 5 is a side view showing a cooling fin portion on a fan included in a fan unit.

FIG. 5 is a side view showing a cooling fin portion on a fan included in every fan unit FU1–FU4. As shown in FIG. 5, the cooling fin portion has height FH. Hereupon, as shown in FIG. 4, the fans included in the fan units FU1–FU4 are arranged more distantly than twice as much as the height FH from the object of cooling 7. In this way, a space 9 is made and cooling air blowing from the fan units FU1–FU4 to the object can be homogeneously mixed. Furthermore, cooling redundancy in the case that trouble arises in any one of the fan units FU1–FU4 can be improved. Namely, if the fans included in the fan units FU1–FU4 are arranged less distantly than twice as much as the height FH from the object of cooling 7, the cooling air does not penetrate effectively to a part of the object under the fan unit with the trouble. It was confirmed experimentally by the inventor of the present invention that temperature of the part of the object increased when the fans were closer than twice the height FH.

Figure 6:
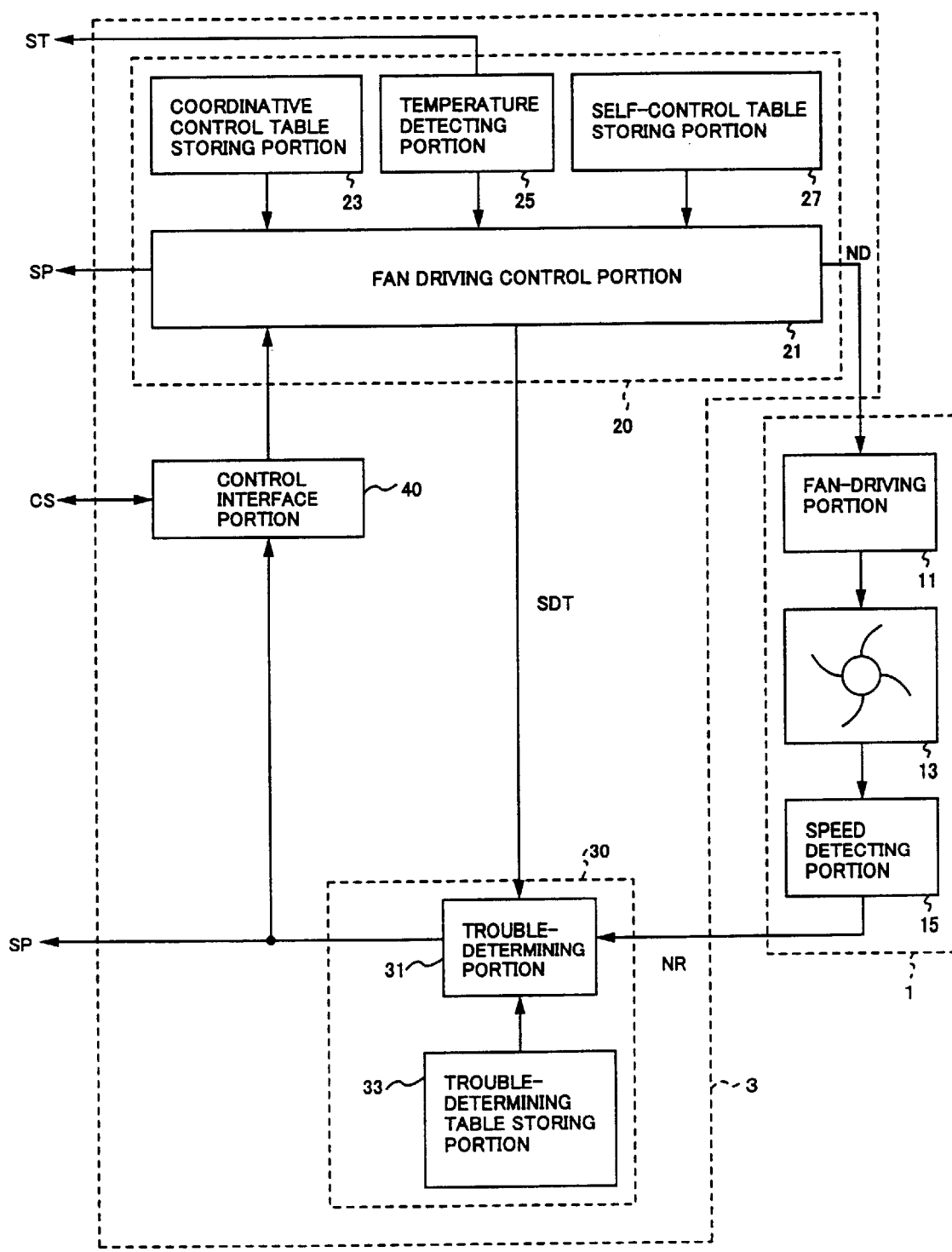
FIG. 6 is a diagram showing a configuration of a fan unit shown in FIG. 2.

FIG. 6 is a diagram showing a configuration of every fan unit FU1–FU4 shown in FIG. 2. As shown in FIG. 6, each of the fan units FU1–FU4 includes a fan portion 1 and a fan control portion 3 connected to the fan portion 1. The fan, portion 1 includes a fan-driving portion 11, a fan 13 connected to the fan-driving portion 11, and a speed detecting portion 15 connected to the fan 13.

On the other hand, the fan control portion 3 includes a temperature detecting control portion 20, a trouble-detecting portion 30, and a control interface portion 40. The temperature detecting control portion 20 includes a fan driving control portion 21, a temperature detecting portion 25 connected to the fan driving control portion 21, a self-control table storing portion 27 connected to the fan driving control portion 21, a coordinative control table storing portion 23 connected to the fan driving control portion 21. The trouble-detecting portion 30 includes a trouble-determining portion 31 and a trouble-determining table storing portion 33 connected to the trouble-determining portion 31.

Figure 7:
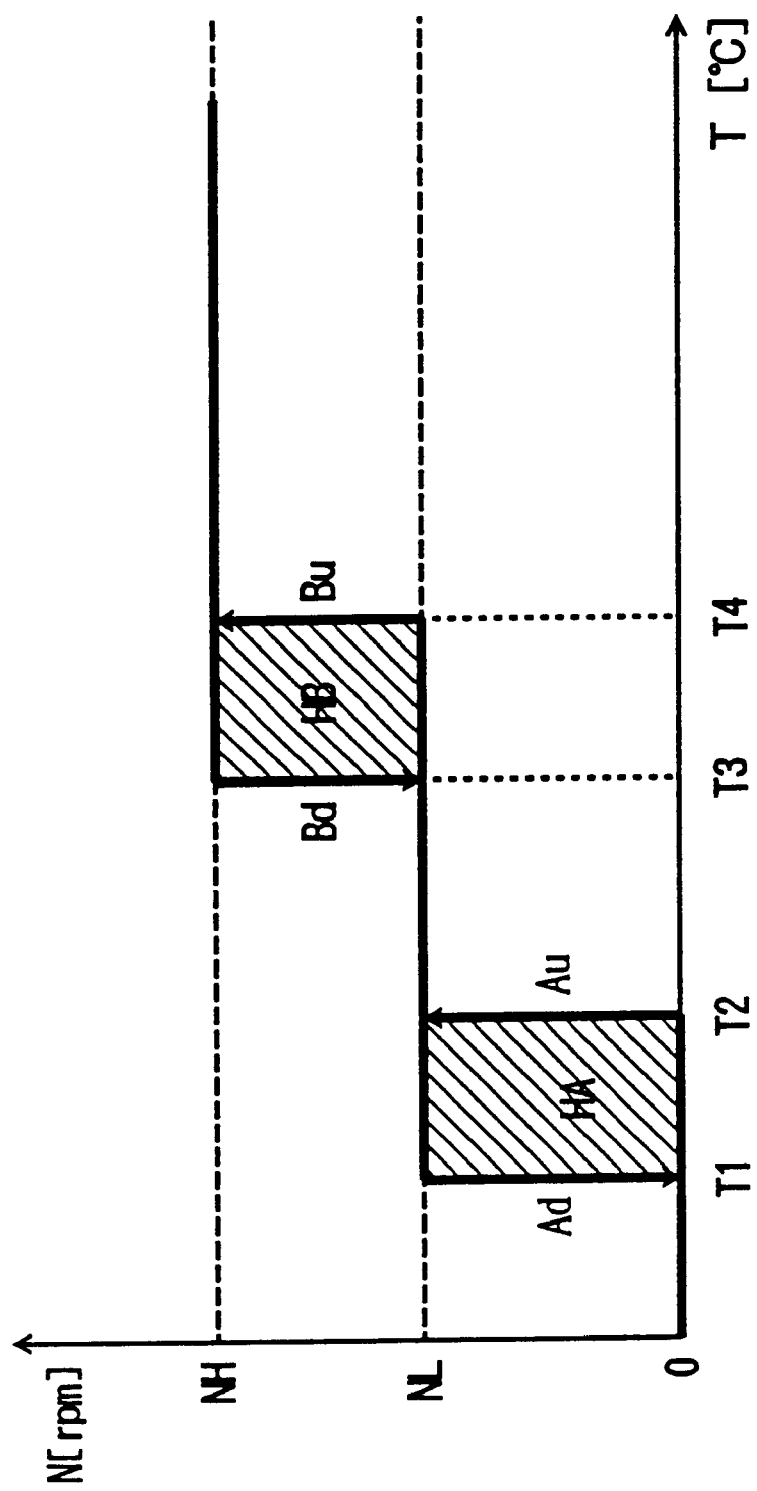
FIG. 7 is a graph for explaining a self-control table stored in a self-control table storage portion.

Hereupon, the self-control table storing portion 27 stores several kinds of self-control tables, whereby a thermal state that the cooling apparatus provides is determined. FIG. 7 is a graph for explaining a self-control table stored in a self-control table storage portion 27. In FIG. 7, a horizontal axis indicates temperature T (°C.) detected by the temperature detecting portion 25 and, a vertical axis indicates the optimum speed N (rpm) to the temperature T. It should be noted that the self-control table is referred to for optimum control of the fan 13 under the temperature T detected by the temperature detecting portion 25, and is utilized when the fan driving control portion 21 supplies the obtained optimum speed (rpm) to the fan-driving portion 11.

The optimum speed (rpm) shown in FIG. 7 is a step function to temperature T, and the optimum curve has hysteresises HA, HP. Namely as shown in FIG. 7, the fan 13 is driven at the speed NH when the temperature detected by the temperature detecting portion 25 is higher than the temperature T4. Next when the temperature detected by the temperature detecting portion 25 becomes lower than the temperature T3 by cooling the object, the optimum speed is determined on a characteristic curve along Bd, Ad. Therefore, the fan 13 is driven at the speed NL between the temperature T3 and the temperature T1. On the other hand, the optimum speed is determined on a characteristic curve along Au, Bu when the temperature of the object increases.

Namely in the self-control mode, the low speed NL and the high speed NH are prepared in advance, and the fan 13 is controlled stepwise according to the temperature of the object.

Figure 8:
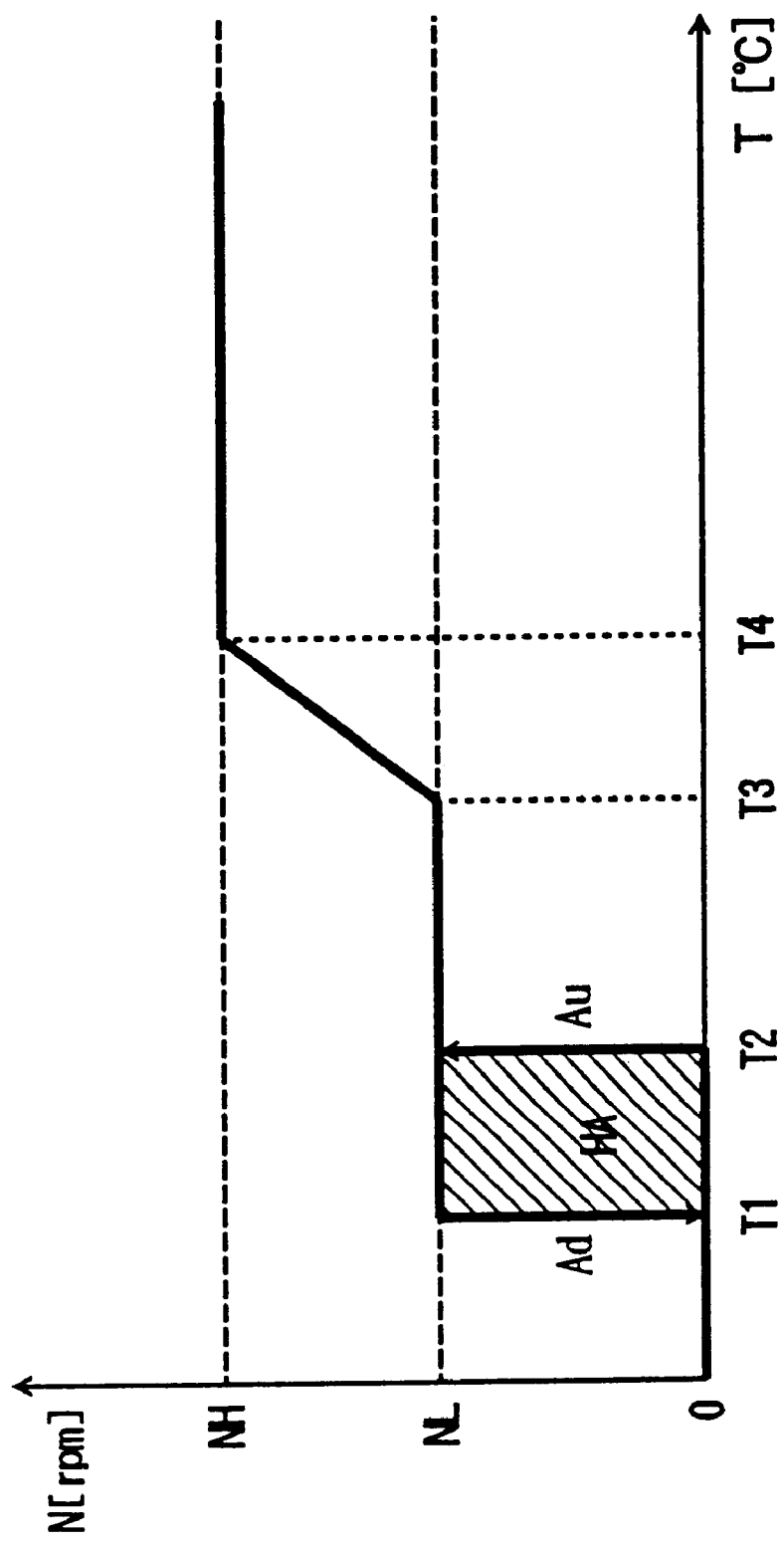
FIG. 8 is a graph for explaining another self-control table stored in the self-control table. storage portion.

FIG. 8 is a graph for explaining another self-control table stored in the self-control table storage portion 27. As shown in FIG. 8, another self-control table can be explained by using a graph like the graph shown in FIG. 7, however the optimum speed of the fan 13 is a linear function to the temperature of the object between the temperature T3 and the temperature T4.

Therefore, since a control according to such a self-control table is not a stepwise control shown in FIG. 7, but a follow-up control to the temperature of the object, there are advantages of decreasing an operational burden on the fan 13 and of preventing an excessive speed. In particular, such a self-control stable is effective when it is needed to control the speed of the fan 13 in the way to follow minute changes of heat load on the object.

The operation of the cooling apparatus in the self-control mode is described in the above. On the other hand, the fan 13 is controlled with reference to the coordinative control table stored previously in the coordinative control table storing portion 23 when the temperature detecting control portion 20 enters the fan unit into the coordinative control mode according to a control signal supplied from the control interface portion 40. Then, an example of the coordinative control tables is shown as a first table in the following.

TABLE 1

| self-control state | | coordinative control state |
|---|---|---|
| suspending state | → | suspending state |
| low-speed rotation state | → | high-speed rotation state |
| high-speed rotation state | → | high-speed rotation state |

As shown at the first table, in the case that the cooling apparatus is entered into the coordinative control mode, the fan 13 under a suspending state in the self-control mode is maintained at the suspending state. Then, the fan 13 with the speed NL under a low-speed rotation state is shifted to the high-speed rotation state and the fan 13 with the speed NH under the high-speed rotation state is maintained at the high-speed rotation state.

In such a way, the fan-driving portion 11 shown in FIG. 6 drives the fan 13 according to the control speed ND supplied from the fan driving control portion 21 in any modes and the speed detecting portion 15 detects a real speed of the fan 13. It should be noted that a feedback control is not used on the speed of the fan 13.

In addition, the fan driving control portion 21 transmits the temperature of the object detected by the temperature-detecting portion 25 as a detected temperature information SDT to the trouble-determining portion 31. Furthermore, the speed-detecting portion 15 transmits the actual detected speed NR on the fan 13 to the trouble-determining portion 31.

Hereupon, the trouble-determining portion 31 refers to the trouble-determining table according to the detected temperature information SDT and obtains a threshold for determining a rise of trouble. Then, the trouble-determining portion 31 compares the speed NR with the threshold and supplies a fan operational information SP for transmitting an occurrence of trouble on the fan 13 to the control interface portion 40 and the monitoring portion 5 when the speed NR is lower than the threshold.

In the following, an example of the trouble-determining tables is shown as a second table.

TABLE 2

| | detecting temperature information | speed set as the threshold [rpm] |
|---|---|---|
| a case of an increase of temperature | less than T 2 | — |
| | T 2 ~ T 4 | ALML |
| | more than T 4 | ALMH |
| a case of a decrease of temperature | less than T 1 | — |
| | T 1 ~ T 3 | ALML |
| | more than T 3 | ALMH |

Figure 9:
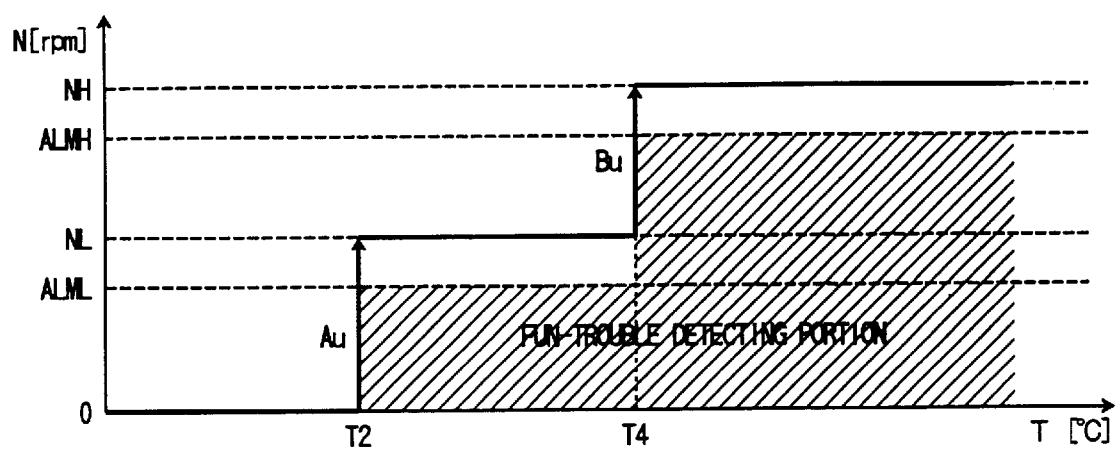
FIG. 9 is a first graph for explaining a first trouble determination table.

In the second table, the trouble detecting speed indicates a threshold for determining a rise of trouble according to the temperature T transmitted by the detected temperature information SDT. As shown in the second table and FIG. 9, in case that the temperature of the object increases as shown in FIG. 7 in the self-control mode, the speed ALML being lower than the speed NL is set as the threshold between temperature T2 and the temperature T4. On the other hand, the speed ALMH being lower than the speed NH is set as the threshold in a range higher than the temperature T4.

Figure 10:
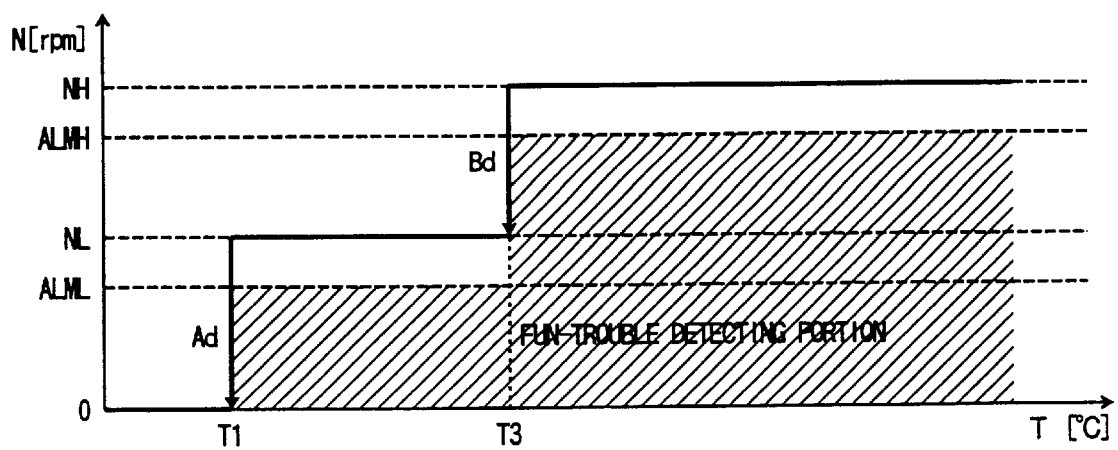
FIG. 10 is a second graph for explaining the first trouble determination table.

As shown similarly in the second table and FIG. 10, in case that the temperature of the object decreases as shown in FIG. 7 in the self-control mode, the speed ALML being lower than the speed NL is set as the threshold between the temperature T1 and the temperature T3. On the other hand, the speed ALMH being lower than the speed NH is set as the threshold in a range higher than the temperature T3.

As the above, turning points of the trouble detecting speed are the same temperatures as turning points of the optimum speed in cases of both increase and decrease in temperature. Namely, the turning points are the temperature T4 in case of increase in temperature and the temperature T3 in case of decrease in temperature.

In the following, another example of the trouble-determining tables is shown as a third table.

TABLE 3

| | detecting temperature information | speed set as the threshold [rpm] |
|---|---|---|
| a case of an increase of temperature | less than T 2 | — |
| | T 2 ~ T 5 | ALML |
| | more than T5 | ALMH |
| a case of a decrease of temperature | less than T 1 | — |
| | T 1 ~ T 5 | ALML |
| | more than T 5 | ALMH |

The above third table is similar to the second table. As shown in the third table and FIG. 11, in case that the temperature of the object increases as shown in FIG. 8 in the self-control mode, the speed ALML being lower than the speed NL is set as the threshold between the temperature T2 and the temperature T5. On the other hand, the speed ALMH being lower than the speed NH is set as the threshold in a range higher than the temperature T5.

Figure 12:
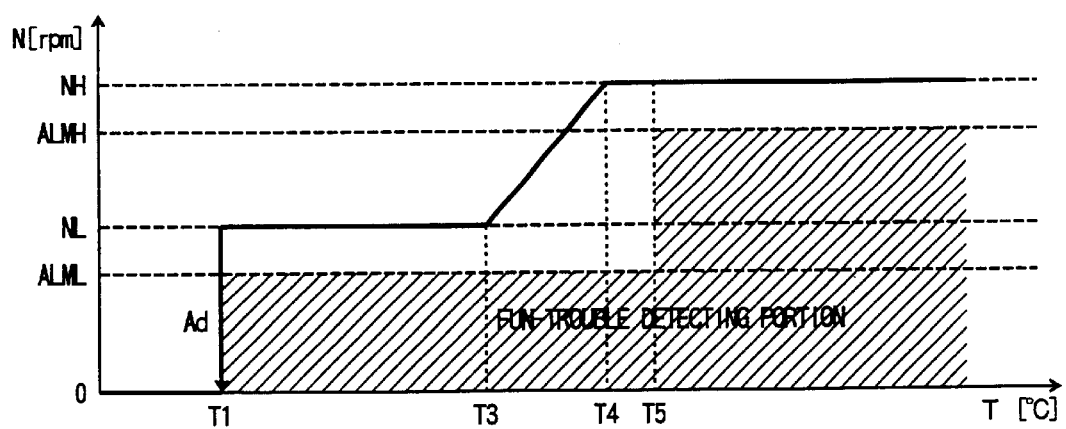
FIG. 12 is a second graph for explaining the second trouble determination table.

As shown similarly in the third table and FIG. 12, in case that the temperature of the object decreases as shown in FIG. 8 in the self-control mode, the speed ALML being lower than the speed NL is set as the threshold between the temperature T1 and the temperature T5. On the other hand, the speed ALMH being lower than the speed NH is set as the threshold in a mange higher than the temperature T5.

Therefore in cases of both increase and decrease in temperature, a turning point of the trouble detecting speed is the temperature T5 that is higher than the temperature T4, being an upper limit of the temperature range corresponding to the variable range of the optimum speed. Namely, the constant speed ALML is set as the threshold between the temperature T3 and the temperature T5.

In such away that the optimum speed is determined by a linear function of the temperature T, it can prevent an error of the trouble detecting and guarantee stability of the operation to make the threshold in the variable range on the optimum speed constant even though a detecting error on the temperature detecting portion 25 or real dispersion on the speed of the fan 13 would arise.

Figure 13:
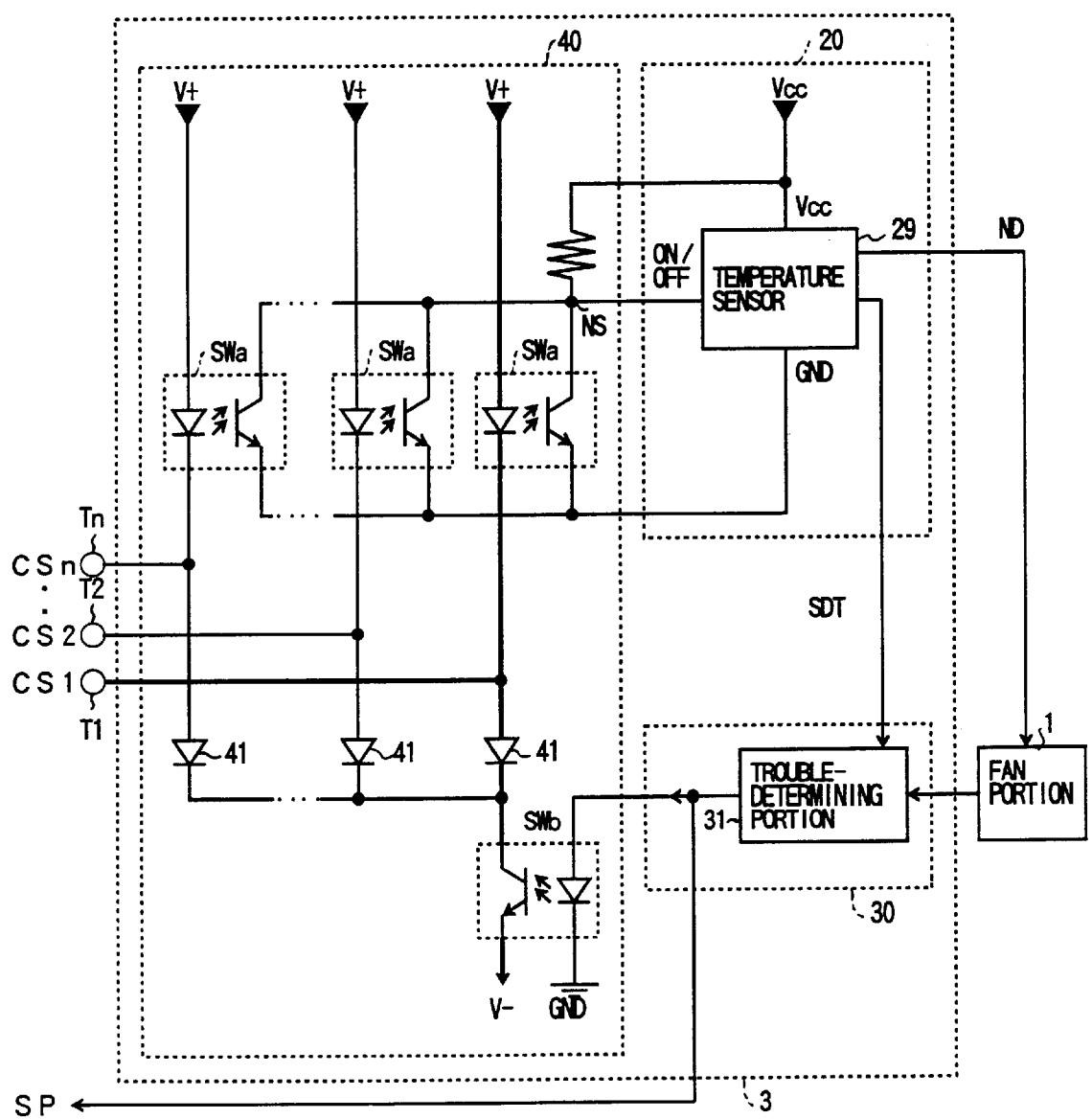
FIG. 13 is a circuit diagram showing a configuration of a control interface portion shown in FIG. 6.

FIG. 13 is a circuit diagram showing a configuration of a control interface portion 40 shown in FIG. 6. As shown in FIG. 13, the control interface portion 40 includes control terminals T1–Tn for inputting and outputting control signals CS1–CSn, a switching element SWb connected between the control terminals T1–Tn and the trouble detecting portion 30, and n pieces of switching elements SWa, being connected to any one of the control terminals T1–Tn and the switching element SWb respectively, for switching between ON-state and OFF-state on the temperature sensor 29. It should be noted that both the switching elements SWa and the switching element SWb include a light emitting diode (LED) and a phototransistor and that an output node of the switching element SWb and respective input nodes of the switching elements SWa are connected via a diode 41.

Since the control interface 40 has such a circuit configuration, the switching element SWb switches on and then the switching element SWa becomes ON-state when trouble on the fan 13 in the fan portion 1 is detected by the trouble detecting portion 30. Therefore, electric potential of a node NS decreases and the temperature sensor 29 becomes OFF-state. Then temperature detecting control portion 20 sets the fan unit to the coordinative control mode.

In addition, the switching element SWa switches on according to the control signals CS1–CSn supplied to the control terminals T1–Tn and the fan unit is set to the coordinative control mode the same way as the above when trouble on the fans in the other fan units is detected.

On the above, if the control terminals T1–Tn of the fan units FU1–FU4 are connected to one another, the switching elements SWb in the fan units FU1–FU4 can control the switching elements SWa in the other fan units. Hence, an efficient coordinative control can be realized. It should be noted that the effect could be obtained more if all the control terminals T1–Tn in a control group described below are connected to one another Further, a fan unit that has a plurality of control terminals T1–Tn can realize the coordinative control on the plurality of fan units.

Figure 14:
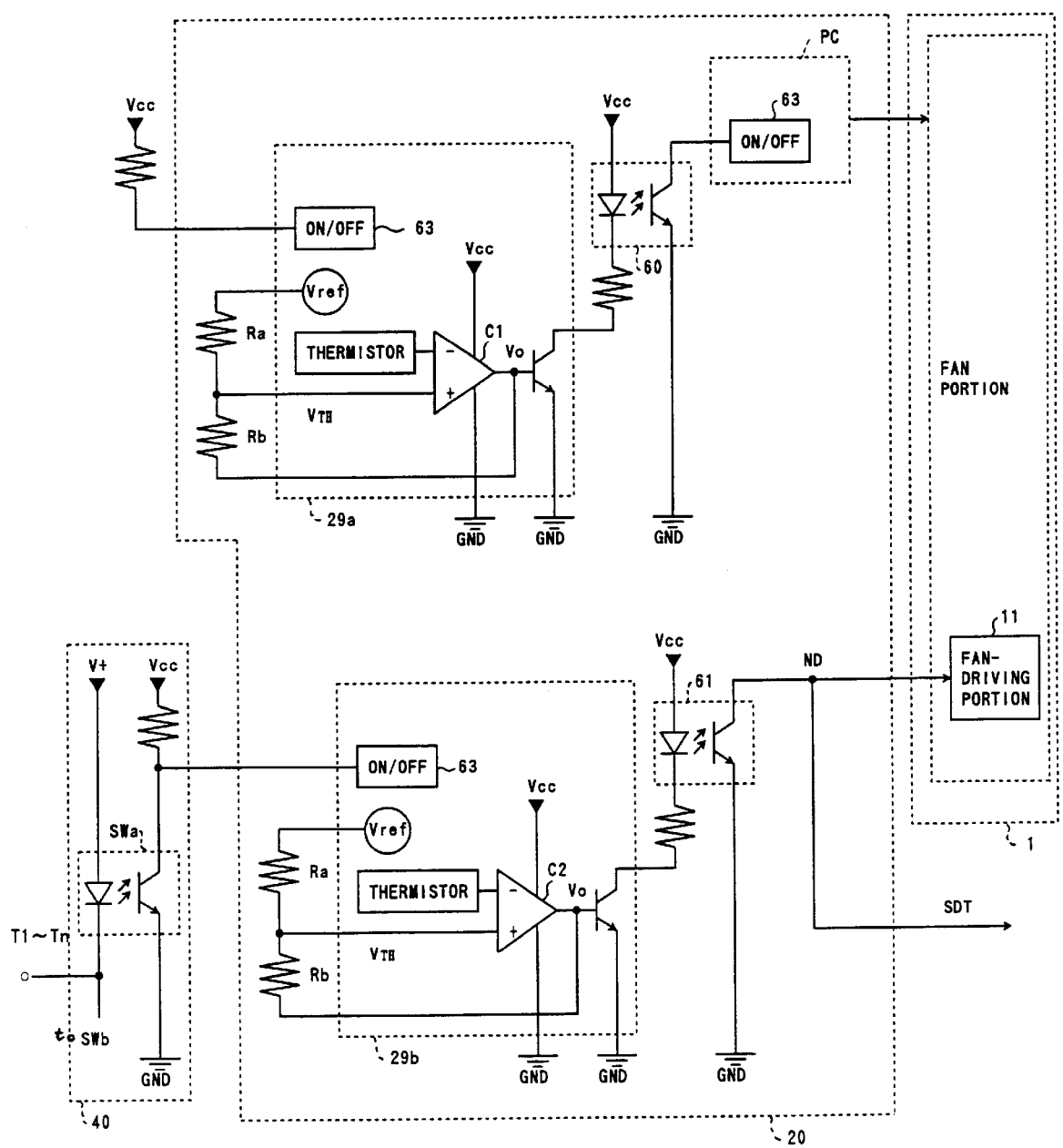
FIG. 14 is a circuit diagram showing a configuration of a temperature detection control portion for realizing the control by the self-control table shown in FIG. 7.

FIG. 14 is a circuit diagram showing a configuration of a temperature detection control portion 20 for realizing the control by the self-control table shown in FIG. 7. As shown in FIG. 14, the temperature detecting control portion 20 includes a temperature sensor 29a, a photocoupler 60 connected to the temperature sensor 29a, a power supply (DC/DC converter) PC connected to the temperature sensor 29a via the photocoupler 60, a temperature sensor 29b, and a photocoupler 61 connected to the temperature sensor 29b. It should be noted that the power supply PC is connected to the fan portion 1 and the photocoupler 61 is connected to the fan-driving portion 11 and the trouble-determining portion 31 shown in FIG. 3.

Hereupon, the temperature sensor 29a has a comparator C1, a minus terminal of which is connected to a thermistor and a plus terminal of which is supplied with voltage VTH produced by dividing a differential voltage between reference voltage $V_{ref}$ and output node voltage $V_o$ by resistances Ra, Rb. In addition, a switch 63 in the temperature sensor 29a is connected to a power supply node $V_{cc}$ via a resistance element and always switches on. On the other hand, a switch 63 in the temperature sensor 29b is connected to the control interface portion 40.

The above temperature sensor 29a is a circuit for realizing the hysteresis HA shown in FIG. 7, and the temperature sensor 29b is a circuit for realizing the hysteresis HB shown in FIG. 7. It should be noted that the hysterisises HA, HB could be set arbitrarily by varying the resistances Ra, Rb in the temperature sensors 29a, 29b.

Controlling of the fan between zero and the speed NL depends on the hysteresis HA and is realized by switching a power supply of the fan portion 1.

Namely in case that the temperature of the object increases, the comparator C1 outputs the positive output node voltage $V_o$ below temperature T2 and the photocoupler 60 is activated. At the time, the power supply PC switches off. In addition, a polarity of the output node voltage $V_o$ outputted by the comparator C1 becomes negative at the temperature T2 and the photocoupler 60 is inactivated. At the time, the power supply PC switches on. Therefore, the fan-driving portion 11 in the fan portion 1 drives the fan 13 at the speed NL. On the other hand, in case that the temperature of the object decreases, the power supply PC switches off and the speed of the fan 13 becomes zero at the temperature T1.

It should be noted that voltage $V_{THH}$ and voltage $V_{THL}$ being supplied to a plus terminal of the comparator C1 for changing the speed at the temperature T2 and the temperature T1, are determined according to the following relation.

$$V_{THH} = V_{ref} + Ra \cdot (V_o - V_{ref})/(Ra+Rb)$$

$$V_{THL} = Rb \cdot V_{ref}/(Ra+Rb)$$

On the other hand, the hysteresis HB shown in FIG. 7 is referred to in case that the fan-driving portion 11 controls the fan 13 between the speed NL and the speed NH according to the control speed ND output from the temperature sensor 29b. It should be noted that the power supply PC is under ON-state and the fan 12 is driven at the speed NL as a precondition in this case.

In addition, the comparator C2 outputs the positive output node voltage $V_o$ below temperature T4 in case that the temperature sensor 29b switches on and temperature of the object increases in the self-control mode. Therefore, the photocoupler 61 is activated and the temperature sensor 29b supplies the control speed ND for driving the fan 13 at the speed NL to the fan-driving portion 11.

Furthermore, a polarity on the output node voltage $V_o$ of the comparator C2 becomes negative at the temperature T4 and the photocoupler 61 is inactivated. Therefore, the temperature sensor 29b supplies the control speed ND for driving the fan 13 at the speed NH to the fan-driving portion 11. The fan-driving portion 11 included in the fan portion 1 drives the fan 13 at the speed NH. It should be noted that the speed of the fan 13 is changed from the speed NH to the speed NL at the temperature T3 in case that the temperature of the object decreases.

On the other hand, the switch element SWa of the control interface portion 40 switches on and the temperature sensor 29b switches off in the coordinative control mode. Therefore, the fan-driving portion 11 is supplied with the control speed ND for driving the fan at the speed NH and drives the fan 13 at the speed NH.

Figure 15:
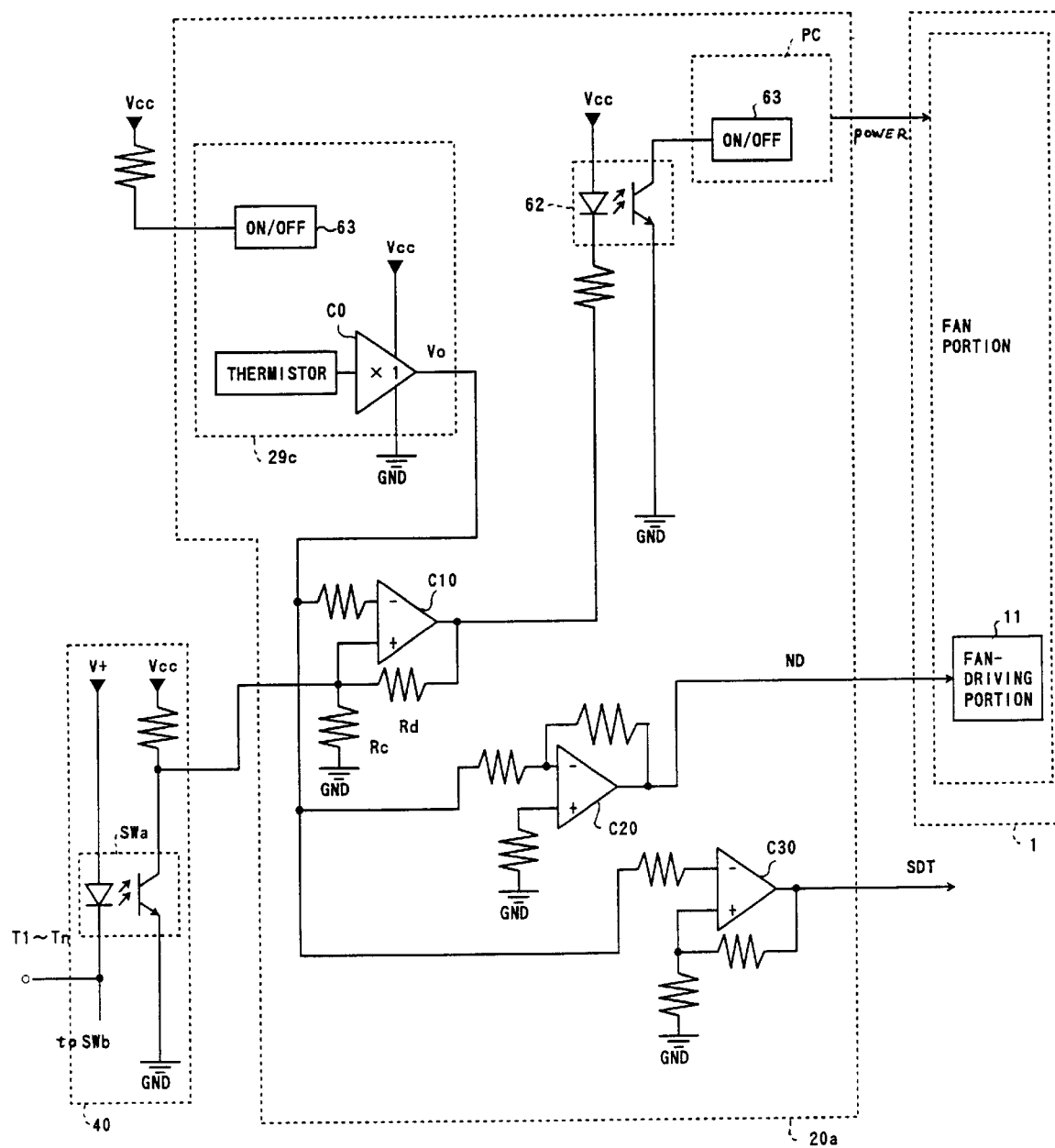
FIG. 15 is a circuit diagram showing a configuration of a temperature detecting control portion for realizing the control by the self-control table shown in FIG. 8.

FIG. 15 is a circuit diagram showing a configuration of a temperature detecting control portion for realizing the control by the self-control table shown in FIG. 8. As shown in FIG. 15, the temperature detecting control portion 20 a includes a temperature sensor 29c, a comparator C10 connected to the temperature sensor 29c, a power supply PC connected to the comparator C10 via the photocoupler 62, an operational amplifier C20 connected to the temperature sensor 29c, and a comparator C30 connected to the temperature sensor 29c.

It should be noted that the power supply PC is connected to the fan portion 1 and the comparator C20 is connected to the fan-driving portion 11, and that the output node of the comparator C30 is connected to the trouble-determining portion 31.

Hereupon, the temperature sensor 29c has an operational amplifier C0, an input node of which is connected to a thermistor. In addition, a switch 63 in the temperature sensor 29c is connected to a power supply node $V_{cc}$ via a resistance element and always switches on. On the other hand, a plus terminal of the comparator C10 is connected to the control interface portion 40.

The above temperature sensor 29c is a circuit for realizing the hysteresis HA shown in FIG. 8 and the operational amplifier C20 is a circuit for controlling the speed in proportion to the temperature between the temperature T3 and the temperature T4. It should be noted that the hysteresises HA can be set arbitrarily by varying the resistances Rc, Rd connected to the comparator C10.

Controlling of the fan between zero and the speed NL depends on the hysteresis HA and is realized by the output voltage $V_o$ of the comparator C0 supplied to the mints terminal of the comparator C10.

Namely the operational amplifier C0 outputs the output voltage $V_o$ in proportion to the temperature detected by the thermistor. Then in case that the temperature of the object increases, the comparator C10 outputs the positive output node voltage below temperature T2 and the photocoupler 62 is activated. At the time, the power supply PC switches off. In addition, a polarity of the output node voltage $V_o$ outputted by the comparator C10 becomes negative at the temperature T2 and the photocoupler 62 is inactivated. At the time, the power supply PC switches on. In such a way, the fan-driving portion 11 in the fan portion 1 drives the fan 13 at the speed NL. It should be noted that the power supply PC switches off and the speed of the fan 13 becomes zero at the temperature T1 in case that the temperature of the object decreases.

Figure 11:
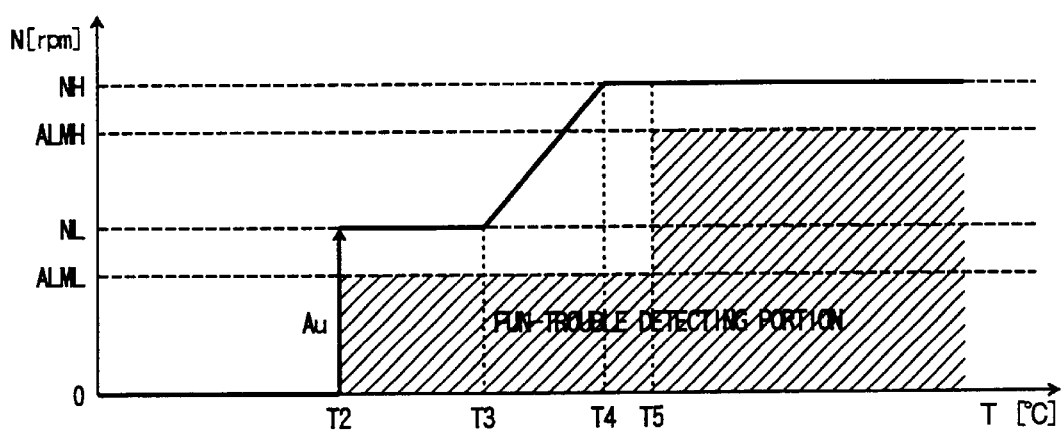
FIG. 11 is a first graph for explaining a second trouble determination table.

On the other hand, it is realized by the comparator C30 to change the threshold at the temperature T5 in the fan trouble detecting regions shown in FIG. 11 and FIG. 12. Namely, the detected temperature information SDT with a positive voltage for setting the speed ALMH as the threshold is supplied to the trouble-determining portion 31 by the comparator C30 below the temperature T5. Above the temperature T5, the comparator C30 supplies the detected temperature information SDT with a negative voltage to the trouble-determining portion 31 for setting the speed ALMH as the threshold.

It should be noted that it is omitted in FIG. 11 and FIG. 12 that the fan trouble detecting regions have hysteresis around the temperature T5 and the hysteresis is realized by an operation of the comparator C30.

In addition, the fan 13 is driven according to the control speed ND supplied to the fan-driving portion 11 as the output voltage of the operational amplifier C20. Then, since the output voltage of the operational amplifier C20 is proportional to temperature detected by a thermistor in the temperature sensor 29c, it can be realized to control the speed proportionally to the temperature as shown in FIG. 11 and FIG. 12.

Figure 16:
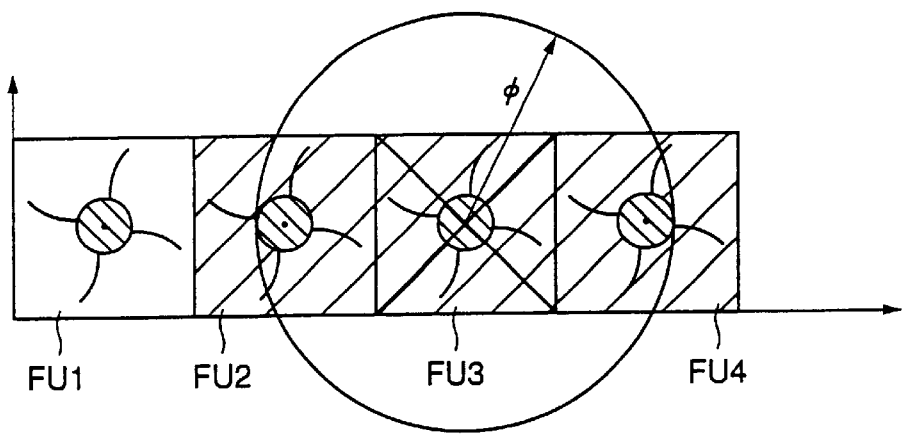
FIG. 16 is a first diagram for explaining a method of composing a control group.

Next, the operation of the above cooling apparatus in the coordinative control mode is described. The fan units within a distance of the fan with trouble occurring are controlled coordinatively in the coordinative control mode. Then, the plurality of fan units within the distance compose a control group. FIG. 16 is a diagram for explaining a method of composing the control group in case that the fan units FU1–FU4 are mounted one-dimensionally.

As shown in FIG. 16, for example when trouble arises in the fan unit FU3, a circle with the radius φ is drawn from the center of the fin portion in the fan unit FU3 on the diagram. Hereupon the fan units FU2–FU4 with the fin portion whose center is within the above circle compose the control group. It should be noted that the radius φ for composing a control group can be set arbitrarily according to a heat load of the object, a structure of the cooling apparatus and a characteristic of the fan.

Figure 17:
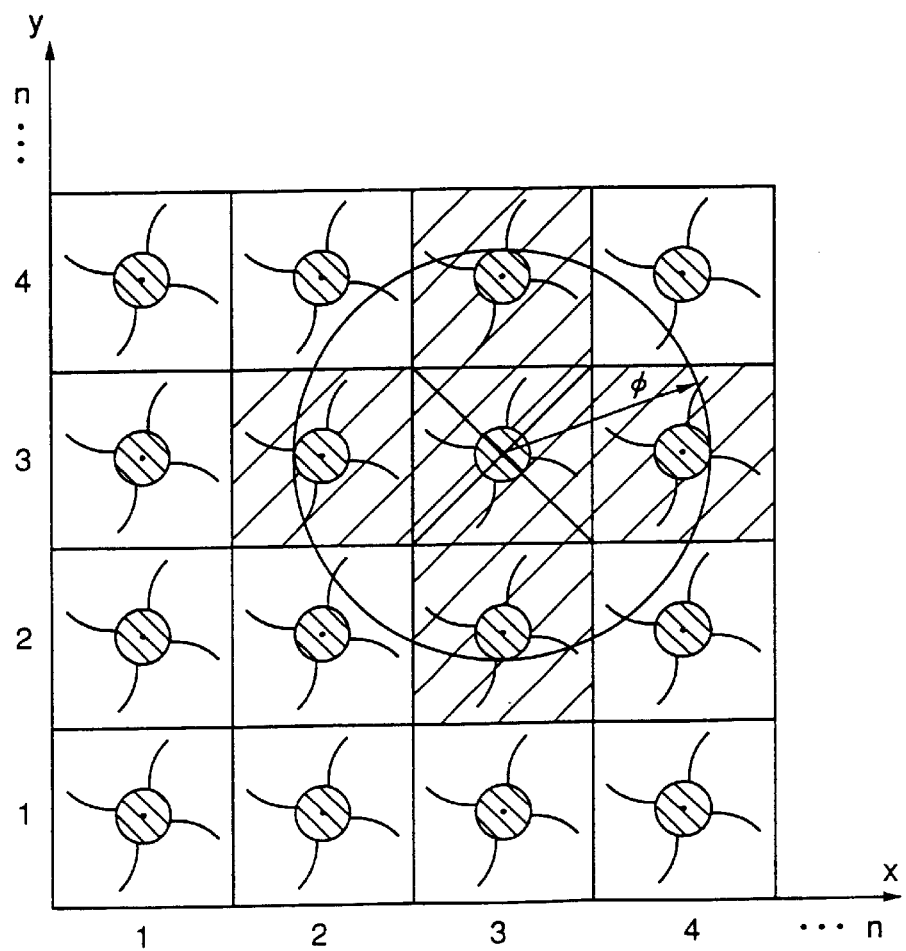
FIG. 17 is a second diagram for explaining the method of composing a control group.

FIG. 17 is a diagram for explaining a method of composing the control group in case that the fan units are mounted two-dimensionally. As shown in FIG. 17, for example when trouble arises in the fan unit with a fin portion whose center is at a coordinate (3,3), a circle with the radius φ is drawn from the center of the fin portion in the fan unit FU3 on the diagram. Hereupon the fan units with the fin portion whose center is at the coordinate (2,3), (3,4), (3,3), (3,2), and (4,3) within the above circle compose the control group.

FIG. 18 is a diagram showing a configuration for realizing the coordinative control by the composed control group. As shown in FIG. 18, the cooling apparatus forms a control group GP1 whose main element is the fan unit FU1, a control group GP2 whose main element is the fan unit FU2, a control group GP3 whose main element is the fan unit FU3, and a control group GP4 whose main element is the fan unit FU4.

In the cooling apparatus with such a configuration, the monitoring portion 5 supplies the control signal CS1 for setting the coordinative control mode to the fan units FU1, FU2 in the control group GP1 in case that the fan unit FU1 has trouble. Similarly, the monitoring portion 5 supplies the control signal CS2 for setting the coordinative control mode to the fan units FU1–FU3 in the control group GP2 in case that the fan unit FU2 has trouble. In case that the fan Unit FU5 has trouble, the monitoring portion 5 supplies the control signal CS3 for setting the coordinative control mode to the fan units FU2–FU4 in the control group GP3. In case that the fan unit FU4 has trouble, the monitoring portion 5 supplies the control signal CS4 for setting the coordinative control mode to the fan units FU3, FU4 in the control group GP4.

Figure 19:
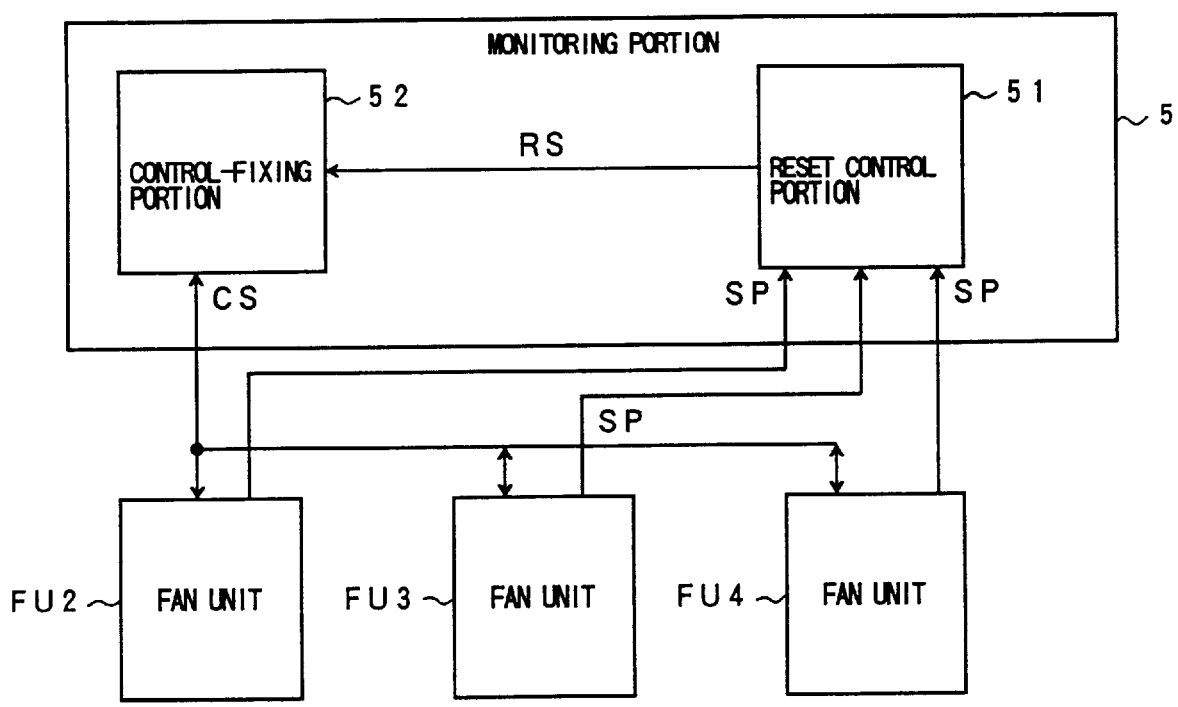
FIG. 19 is a diagram for explaining the coordinative control by the control group in case that the fan unit shown in FIG. 18 has a problem.

FIG. 19 is a diagram for explaining the coordinative control by the control group in case that the fan unit FU3 shown in FIG. 18 has trouble. As shown in FIG. 19, the monitoring portion 5 includes a reset control portion 51 and a control-fixing portion 52. The reset control portion 51 is supplied with the fan operational information SP by the fan units FU2–FU4 and monitors the states of the respective fans. The control-fixing portion 52 is connected to the reset control portion 51 and inputs/outputs the control signal CS from/to the fan units FU2–FU4.

The following fourth table indicates states of the signals CS, RS, SP shown in FIG. 19 and the operational states of respective fan units FU2–FU4 shown in FIG. 19.

TABLE 4

|   | under a normal operation | a case of trouble-rising to the fan unit FU3 | a case of removing the fan in the fan unit FU3 | a case of remounting the fan into the fan unit FU3 |
|---|---|---|---|---|
| control signal CS | 0 | 1 coordinative control by the trouble | 1 fixing of coordinative control | 0 removing the fixing of the control by reset |
| reset signal RS | 0 | 0 | 0 | 1 reset |
| mounting information SP |  |  |  |  |
| fan unit FU2 | 1 | 1 | 1 | 1 |
| fan unit FU3 | 1 | 1 | 0 no-mounting state | 1 |
| fan unit FU4 | 1 | 1 | 1 | 1 |
| trouble information SP |  |  |  |  |
| fan unit FU2 | 0 | 0 | 0 | 0 |
| fan unit FU3 | 0 | 1 trouble-rising state | 0 no-mounting state | 0 |
| fan unit FU4 | 0 | 0 | 0 | 0 |

In the above forth table, 0 on the signal SP concerning a mounting information indicates a non-mounting state and 1 on the same indicates a mounting state. In addition, 0 on the signal SP concerning trouble information indicates a normal operation state and 1 on the same indicates a trouble state.

As shown in the above forth table, the signals SP concerning the trouble information output from the fan units Fu2–FU4 are 0 and the signals SP concerning the mounting information are 1. The control-fixing portion 52 supplies the control signals CS, having 0. as a logic level, to the fan nits FU2–FU4. Then, the fan units FU2–FU4 are controlled under the self-control mode.

Hereupon, the fan unit FU3 supplies the signal SP concerning the trouble information, having 1 as a logic level, to the reset control portion 51. The control fixing portion 52 supplies the control signals CS, having 1 as a logic level, to the fan units FU2–FU4 for directing the coordinative control mode. Therefore, the fan units FU2–FU4 enter the coordinative control mode.

In addition, in case that the fan unit FU3 is removed for an exchange, the fan unit FU3 supplies the signal SP concerning the mounting information having 0 as a logic level to the reset control portion 51 since the fan unit FU3 comes into a non-mounting state where the fan unit FU3 has no fan. It should be noted that the fan unit FU2 outputs the signal SP concerning the trouble information, having 0 as a logic level, at the time.

On the other hand, the control-fixing portion 52 supplies the signal CS having 1 as a logic level for fixing the coordinative control mode to the fan units FU2–FU4. Therefore, the fan units FU2–FU4 are fixed in the coordinative control mode. By including the control-fixing portion 52 that has a function to fix the coordinative control mode, the cooling apparatus can control the fan units within a control group coordinatively even though a fan that has become out of order is removed for an exchange.

Next, the fan unit FU3 supplies the signal SP concerning the mounting information, having 1 as a logic level, to the reset control portion 51 in case that a normal fan is remounted on the fan unit FU3. After that, the reset control portion 51 supplies the reset signal RS, having 1 as a logic level, to the control-fixing portion 52. The control fixing portion 52 supplies the control signals CS, having 0 as a logic level, to the fan units FU2–FU4 for removing the coordinative control mode. Therefore, the fan units FU2–FU4 restart the operations under the self-control mode.

As described above, according to the cooling apparatus as the first embodiment, the excessive speed of the fan is prevented by controlling respective fans under the self-control mode. In addition, lengthening of service life and decreasing power consumed and noise of the cooling apparatus can be realized by preventing the excessive speed. In another aspect, the above configuration for controlling the fans independently can decrease the cost of the maintenance on the cooling apparatus by minimizing a fan unit requirement for the maintenance.

Furthermore, by having the self-control mode and the coordinative control mode, it can be realized to minimize the decrease of the cooling power when trouble rises with at least one of the fans.

[Second Embodiment]

A cooling apparatus according to the second embodiment has a similar configuration to the above cooling apparatus according to the first embodiment. However, the cooling apparatus according to the second embodiment differs in a point that the monitoring portion 5 is controlled by software.

Figure 20:
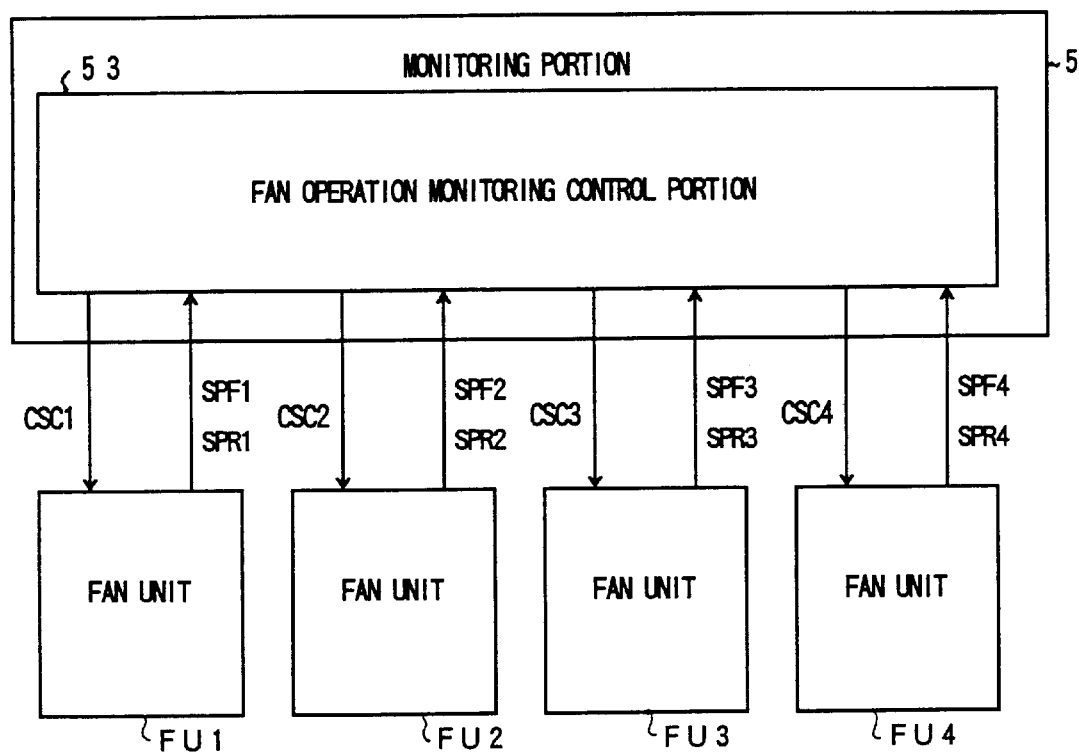
FIG. 20 is a diagram for explaining an operation of a monitoring portion in the cooling apparatus according to a second embodiment of the present invention.

FIG. 20 is a diagram for explaining an operation of monitoring portion 5 in the cooling apparatus according to the second embodiment of the present invention. The fan operation monitoring control portion 53 in the monitoring portion 5 shown in FIG. 20 has a CPU and is controlled by software. Hereupon, the fan operation monitoring control portion 53 supplies respective control signals CSC1–CSC4 to the corresponding one of the fan units FU1–FU4. The respective fan unit FU1–FU4 supply the signals SPF1–SPF4 as the trouble information and the signals SPR1–SPR4 as the mounting information to the fan operation monitoring control portion 53.

The following fifth table indicates states of the signals CSC1–CSC4 supplied to the fan units FU1–FU4 under a normal state and four conditions that any one of the fan units FU1–FU4 has trouble. It should be noted that 0 in the table indicates a signal for setting the self-control mode and 1 is a signal for setting the coordinative control mode.

TABLE 5

| | normal operation | four cases that a trouble arises to the fan unit | | | |
| | | fan unit FU1 | fan unit FU2 | fan unit FU3 | fan unit FU4 |
|---|---|---|---|---|---|
| CSC1 | 0 | 1 | 1 | 0 | 0 |
| CSC2 | 0 | 1 | 1 | 1 | 0 |
| CSC3 | 0 | 0 | 1 | 1 | 1 |
| CSC4 | 0 | 0 | 0 | 1 | 1 |

With reference to the fifth table, the operation of the monitoring portion 5 according to the second embodiment is described in the following. In case that all the fan units FU1–FU4 operate normally, the control signals CSC1–CSC4 is 0 and the fan units FU1–FU4 operate in the self-control mode. Hereupon, the signals CSC1, CSC2 supplied to the fan units FU1, FU2 become 1 and the fan units FU1, FU2 operate in the coordinative control mode when trouble arises in the fan unit FU1.

Similarly, the signals CSC1–CSC3 supplied to the fan units FU1–FU3 become 1 and the fan units FU1–FU3 operate in the coordinative control mode when trouble arises in the fan unit FU2. When trouble arises in the fan unit FU3, the signals CSC2–CSC4 supplied to the fan units FU2–FU4 become 1 and the fan units FU2–FU4 operate in the coordinative control mode. When trouble arises in the fan unit FU4, the signals CSC3, CSC4 supplied to the fan units FU3, FU4 become 1 and the fan units FU3, FU4 operate in the coordinative control mode.

Figure 21:
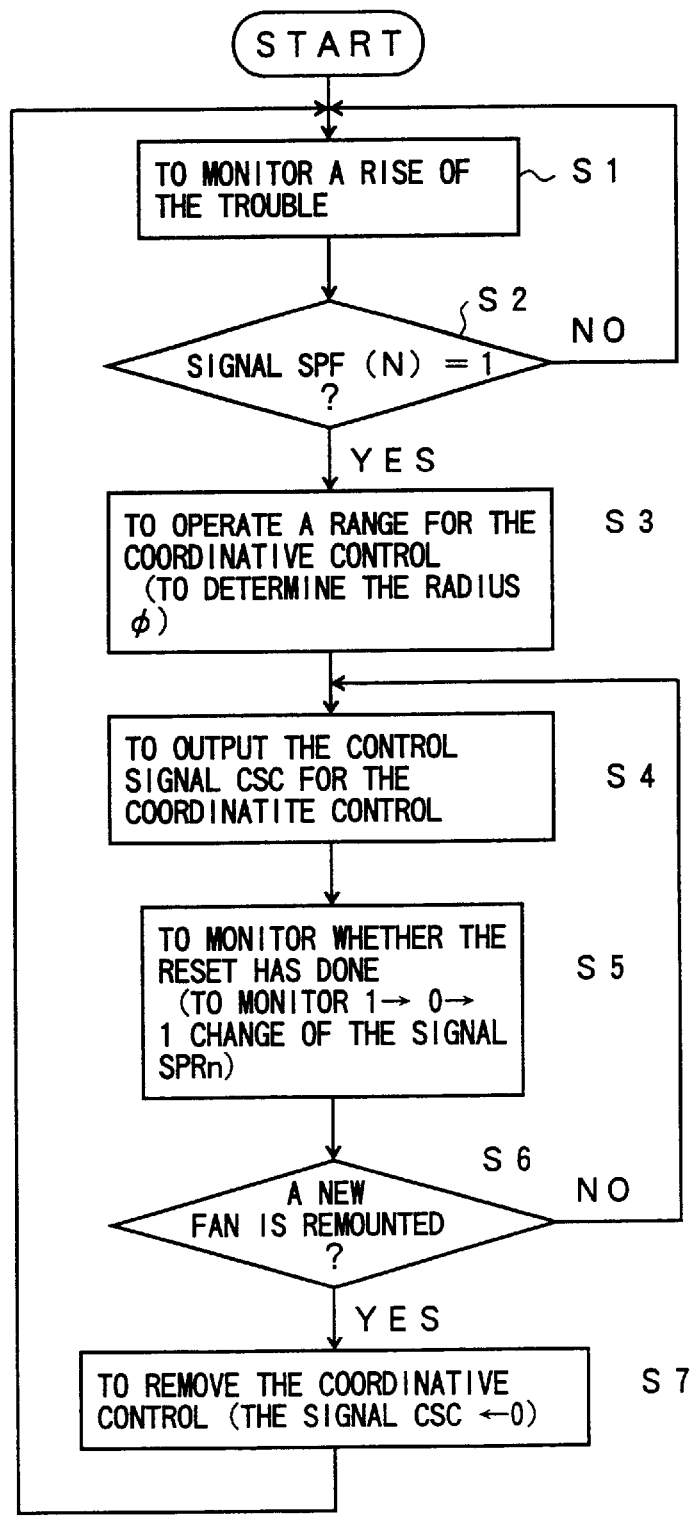
FIG. 21 is a flow diagram showing an operation of a fan-operation monitoring control portion shown in FIG. 20.

FIG. 21 is a flow diagram showing an operation of the fan operation monitoring control portion 53 shown in FIG. 20. With reference to FIG. 21, the operation of the fan operation monitoring control portion 53 is described in the following.

In the step S1, the fan operation monitoring control portion 53 monitors the signals SPF as the trouble information supplied from the respective fan units. In the next step S2, the fan operation monitoring control portion 53 determines whether the signal SPF is 1. Hereupon, the fan operation monitoring control portion 53 returns to the step S1 and a fan trouble monitoring routine is repeated when the fan operation monitoring control portion 53 determines that the signal SPF is not 1.

On the other hand, in case that trouble arises in any one of the fan units and the supplied signal SPF is judged to be 1, a range to be entered into the coordinative control mode is determined in the step S3. Then, the radius φ shown in FIGS. 16, 17 are determined in such a way.

In the step S4, the fan operation monitoring control portion 53, as shown in FIG. 16 and FIG. 17, supplies the control signals CSC having 1 as a logic level to all the fan units in the circle with the radius φ, whereby the fan operation monitoring control portion 53 enters the fan units into the coordinative control mode.

In the step S5, the fan operation monitoring control portion 53 monitors a change into 1 of the signal SPRn supplied from the fan unit the fan in which is removed for the exchange. In the step S6, the fan operation monitoring control portion 53 determines whether a new fan is remounted and maintains the coordinative control by returning to the step S4 in case of having determined that a new fan is not remounted.

On the other hand, in case of having determined that a new fan is remounted, the fan operation monitoring control portion 53 supplies the control signals CSC, having 0 as a logic level, to the fan units that are entered into the coordinative control mode, whereby the fan operation monitoring control portion 53 enters the fan units into the self-control mode after having removed the coordinative control mode. In such a way, the fan operation monitoring control portion 53 returns to the step S1 and restarts the self-control of respective fan units.

As described above, according to the above second embodiment, the similar effect to the first embodiment can be obtained and it can be realized to make the configuration of the cooling apparatus more simple since the monitoring portion 5 is controlled by the software. Furthermore, the cooling apparatus can cool various kinds of objects by rewriting the software.

[Third Embodiment]

Figure 22:
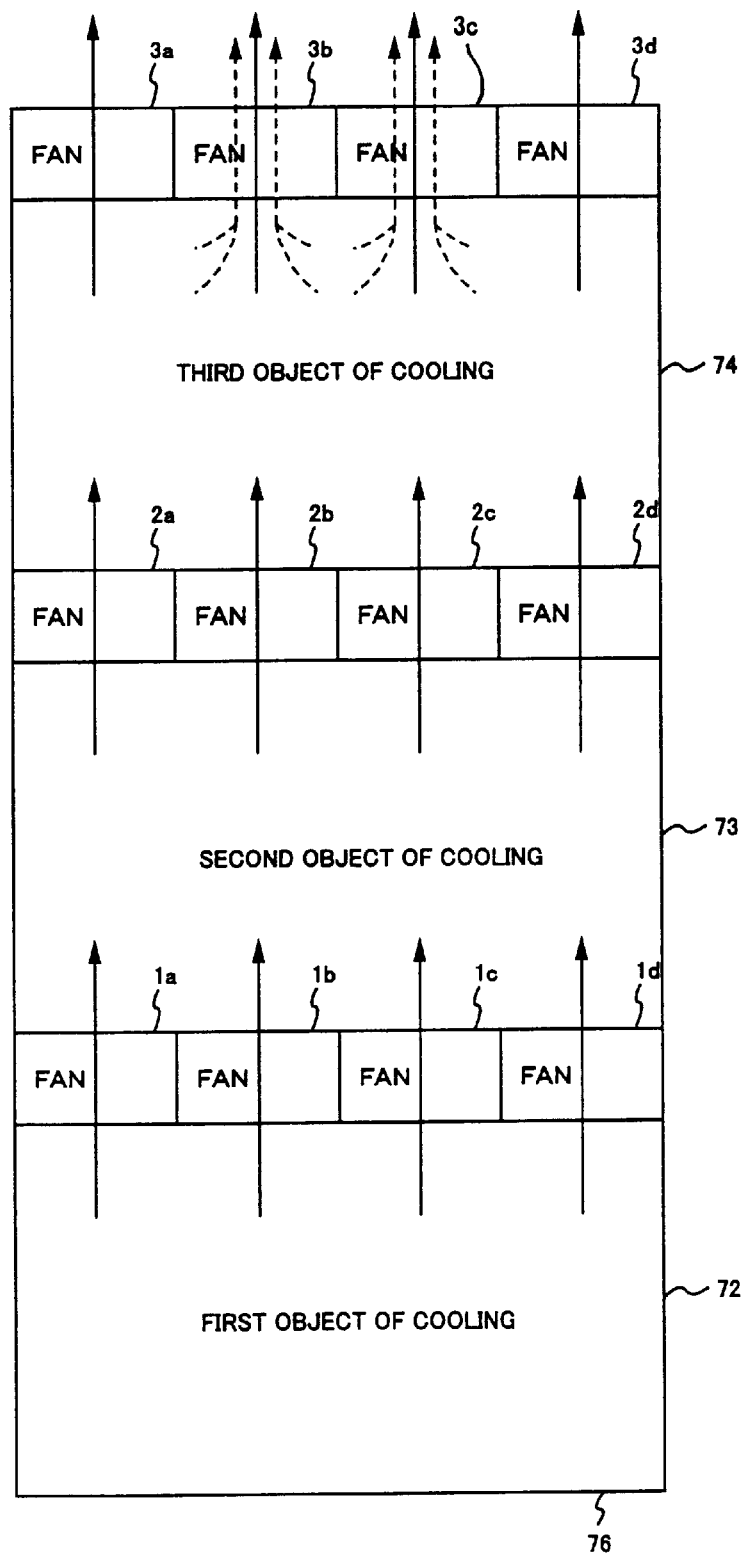
FIG. 22 is a diagram showing a configuration of a cooling system without heat shielding boards.

FIG. 22 is a diagram showing a configuration of a cooling system without heat shielding boards. It should be noted that the fans 1a–1d, 2a–2d, 3a–3d are driven at a low speed under the normal temperature or a temperature at which the cooling apparatus has no thermal load and at a high speed under the high temperature.

As shown in FIG. 22, three sets of the fans 1a–1d, 2a–2d,3a–3d are stacked up on three stages respectively. Therefore, there is a largo possibility that the fans of self-control type located on the high stage, for example the fans 3b, 3c, are driven at a high speed since the fans on the high stage are supplied with the air heated by the objects on the lower stages.

However, as seen in FIG. 22, the air flow through the third object 74 can not be increased since, the air flow supplied to the third object is not enough even though the speed of the fans 3b, 3c increase. What is worse, the loads, the consumptive power and noise of the fans are increased.

Figure 23:
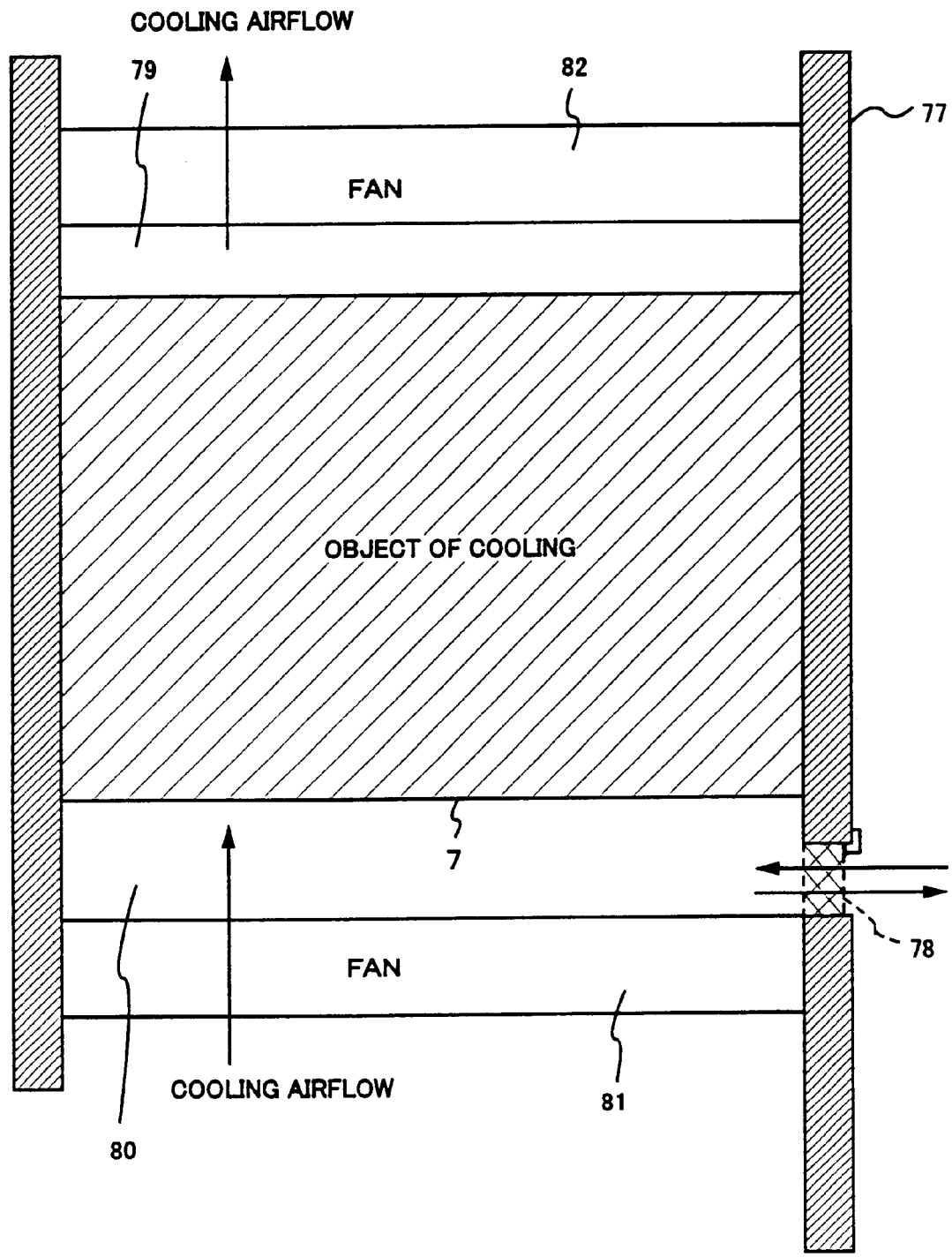
FIG. 23 is a diagram showing a basic configuration of a cooling system according to a third embodiment of the present invention.

FIG. 23 is a diagram showing a basic configuration of a cooling system according to a third embodiment of the present invention. As shown in FIG. 23, the cooling system of so-called "push-pull type" includes a fan 81 for supplying air to the object of cooling 7, a fan 82 for exhausting the air that takes heat from the object 7, being arranged in the opposite direction as the fan 81 is from the object 7, a case 77 for containing the fans 81, 82, and a shielding portion 78 with a hole or a mesh. It should be noted that the radio waves emitted from the cooling system can be shielded if the mesh is made of metal and connected electrically to the case 77.

In addition, the fan 81 is arranged so that a space 80 is formed between the object of cooling 7 and the fan 81. Similarly, the fan 82 is arranged so that a space 75 is formed between the object 7 and the fan 82. Hereupon, the air is supplied to the space 80 through the shielding portion 78 or exhausted from the space 90 through the shielding portion 78. It should be noted that arrows in the FIG. 23 indicate the flows of the air.

Then, the fan 81 increases the pressure of a space between the fan 81 and the fan 82. On the other hand, the fan 82 decreases the pressure of the space between the fan 81 and the fan 82. Therefore, the air in the space seems to flow uniformly in a direction, whereby an efficient cooling can be realized. Furthermore, in case that there is a difference in the characteristic between the fan 81 and the fan 82, the shielding portion 78 compensates the flow. Namely, the air is supplied into the case 77 through the shielding portion 78 when the flow through the fan 82 is more than that through the fan 81. To the contrary, the air is exhausted from the case 77 through the shielding portion 78 when the flow through the fan 82 is less than that through the fan 81.

Figure 24:
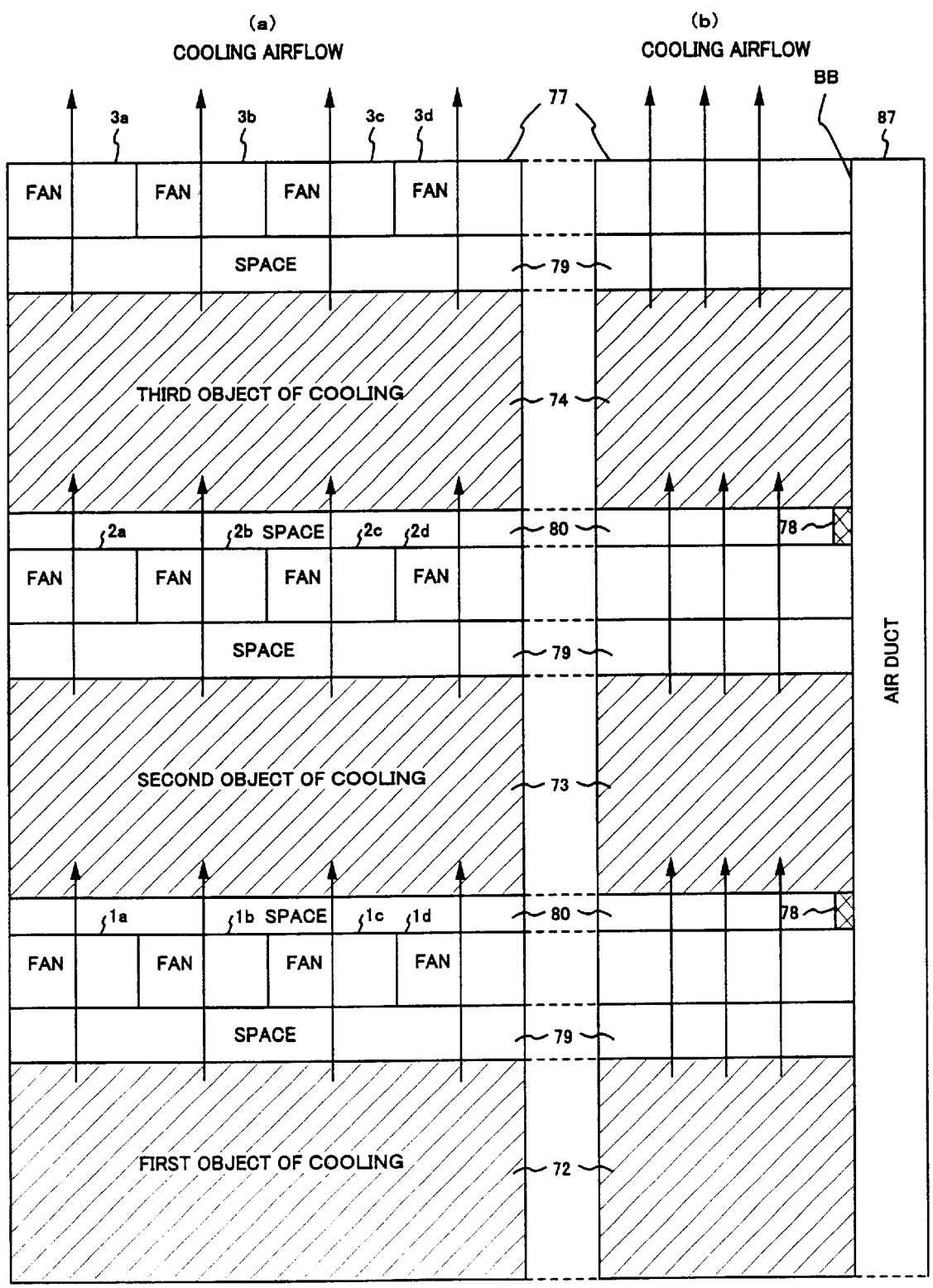
FIG. 24 is a diagram showing a large configuration of the cooling system shown in FIG. 23.

FIG. 24 is a diagram showing a large configuration of the cooling system shown in FIG. 23. It should be noted that the FIG. 24(a) is a front view of the cooling system and FIG. 24(b) is a side view thereof. Though the cooling system shown in FIG. 24 is similar to the system shown in FIG. 22, it differs from the system shown in FIG. 22 in two points. One point is that spaces 79, 80 are formed between the fans 1a–1d, 2a–2d, 3a–3d and the objects of cooling 72, 73, 74. The other point is that an air duct 87 is arranged at the back of the cooling system and connected to the spaces 80 via the shielding portions 78. It should be noted that the cooling system has a backboard BB with the shielding portions 78, and that the air duct 87 can be arranged at the side of the cooling system instead of the back of it. On the above, the radio waves emitted from the cooling system can be shielded more effectively if the backboard is coated with metal that is connected electrically to the case 77.

In addition, the respective fans 1a–1d, 2a–2d, 3a–3d control their own respective speeds according to the temperature inside the cooling apparatus and the arrows in the FIG. 24 indicate the flow of air in the case that all the fans 1a–1d, 2a–2d, 3a–3d are driven at a low speed.

Figure 25:
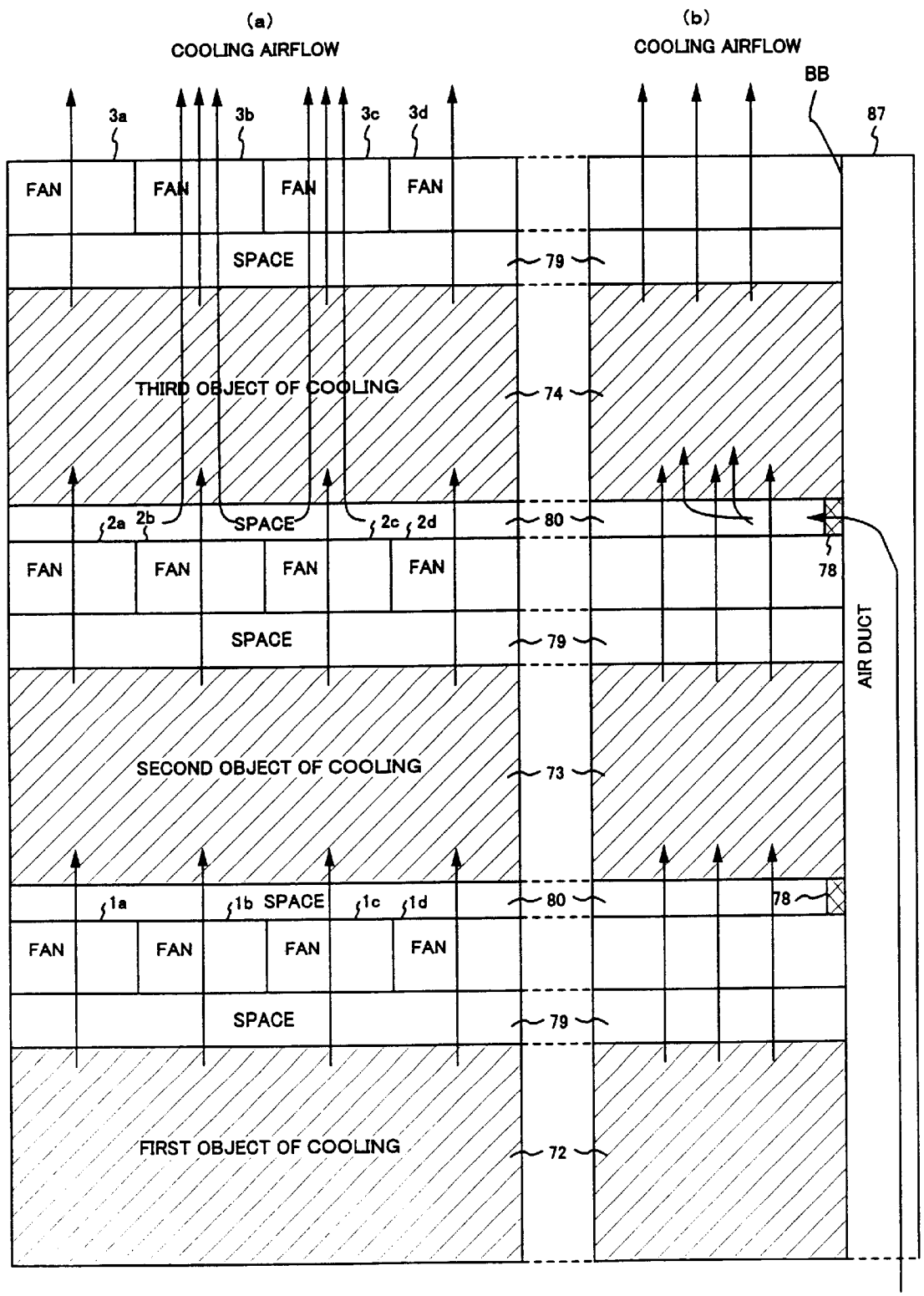
FIG. 25 is a diagram showing an example of airflow in the cooling system shown in FIG. 24.

FIG. 25 is a diagram showing an example of airflow in the cooling system shown in FIG. 24. As shown in FIG. 25, the fans 3b, 3c at the center of the highest stage are driven at a higher speed than the fans 2a–2d. Then, the air flows through the space 80 by the air duct 87 to compensate for the lowered pressure between the fans 2a–2d and the fans 3a–3d. Therefore, the fans 3b, 3c can cool the third object without being restricted by the characteristics of the fans 2a–2d on the lower stage. It should be noted that 3 centimeters is enough for the height of the space 80 to compensate for the difference in the flow between the fans 2a–2d and the fans 3a–3d if the difference is not so much.

According to the above third embodiment, the efficient cooling is realized by providing compensating air for the fans.

[Fourth Embodiment]

Figure 26:
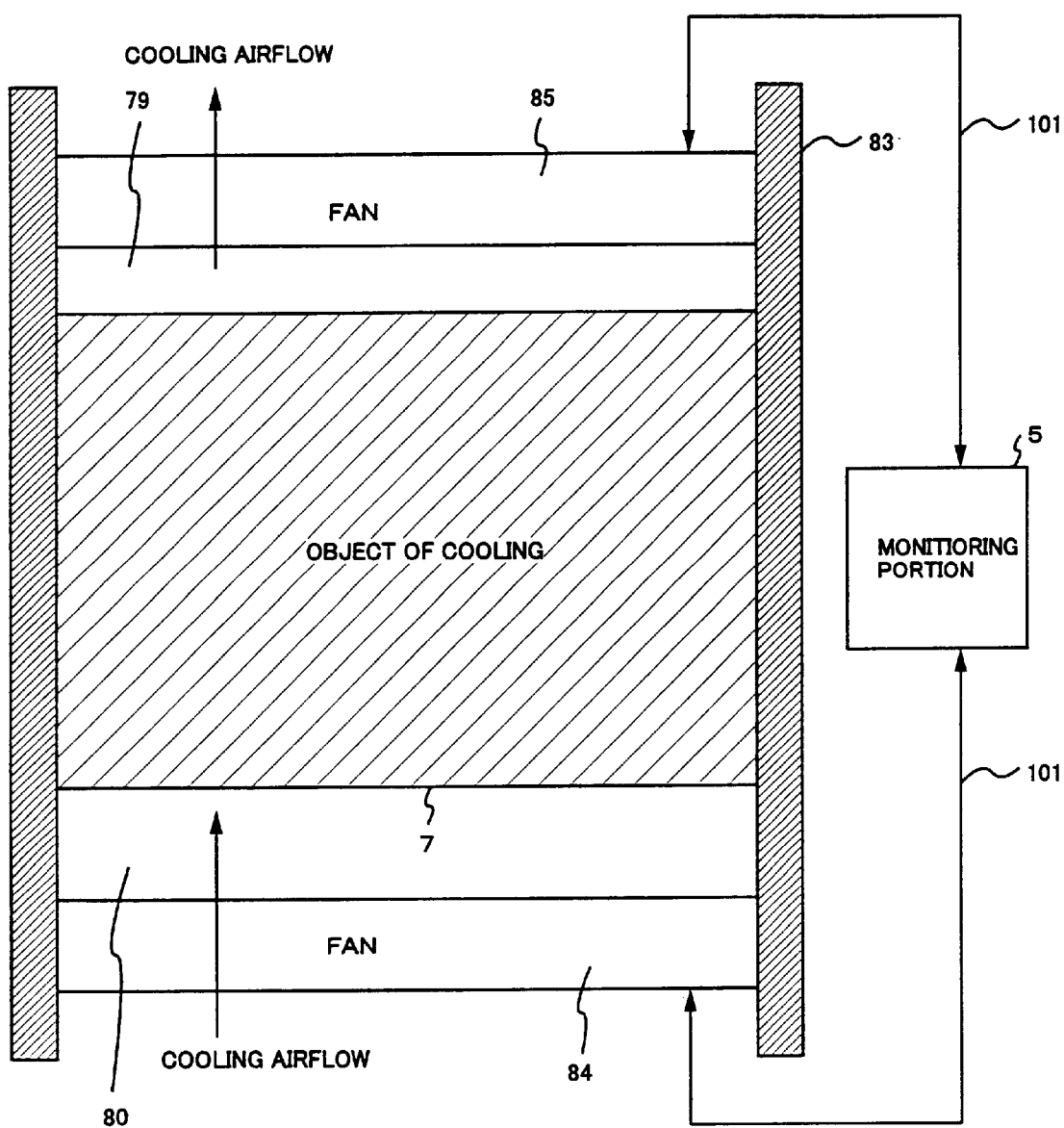
FIG. 26 is a diagram showing a basic configuration of a cooling system according to a forth embodiment of the present invention.

FIG. 26 is a diagram showing a basic configuration of a cooling system according to a fourth embodiment of the present invention. As shown in FIG. 26, the cooling system is similar to the cooling system shown in FIG. 23. However, there is a different point that the fans 84, 85 included in different cooling apparatuses are connected to the monitoring portion 5 by buses 101 and controlled coordinatively.

Figure 27:
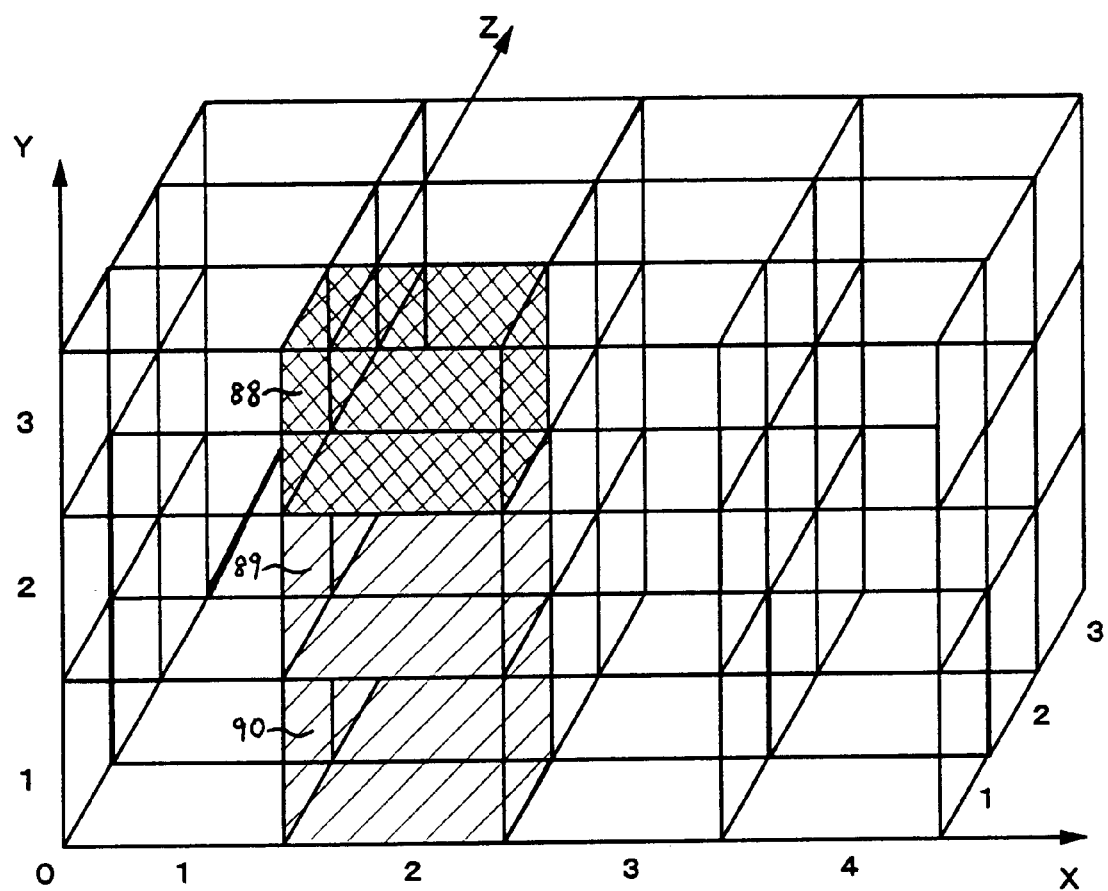
FIG. 27 is a diagram for explaining how to control the cooling system shown in FIG. 26.

FIG. 27 is a diagram for explaining how to control the cooling system shown in FIG. 26. It should be noted that a coordinate on the x-axis indicates the position in the transverse direction, a coordinate on the y-axis indicates the position in the vertical direction, and a coordinate on the z-axis indicates the position in depth. Hereupon, for example the four fans at the coordinates (1,3,1), (2,3,1), (3,3,1), (4,3,1) compose a cooling apparatus.

Then, for example the fans 89, 90 at the coordinates (2,2,1) and (2,1,1) are also driven at a high speed when the fan at the coordinate (2,3,1) is driven at a high speed. Namely, in case that a fan is driven at a high speed, the fans arranged under the fan are also driven at a high speed. Therefore, the air resistance on the suction by the fan 88 is decreased. In addition, the efficient cooling can be realized by driving only the fans selected according to the position at a high speed. It should be noted that the other fans could be driven under the self-control mode in the above case.

Further, since the space 80 shown in FIGS. 23–26 can be omitted by adopting the above cooling system, the scale of the cooling system can be decreased.

On the other hand, the cooling system having both features shown in FIGS. 23, 26 seems to be useful in case that the speed of the fan is controlled linearly to the detected temperature.

Figure 28:
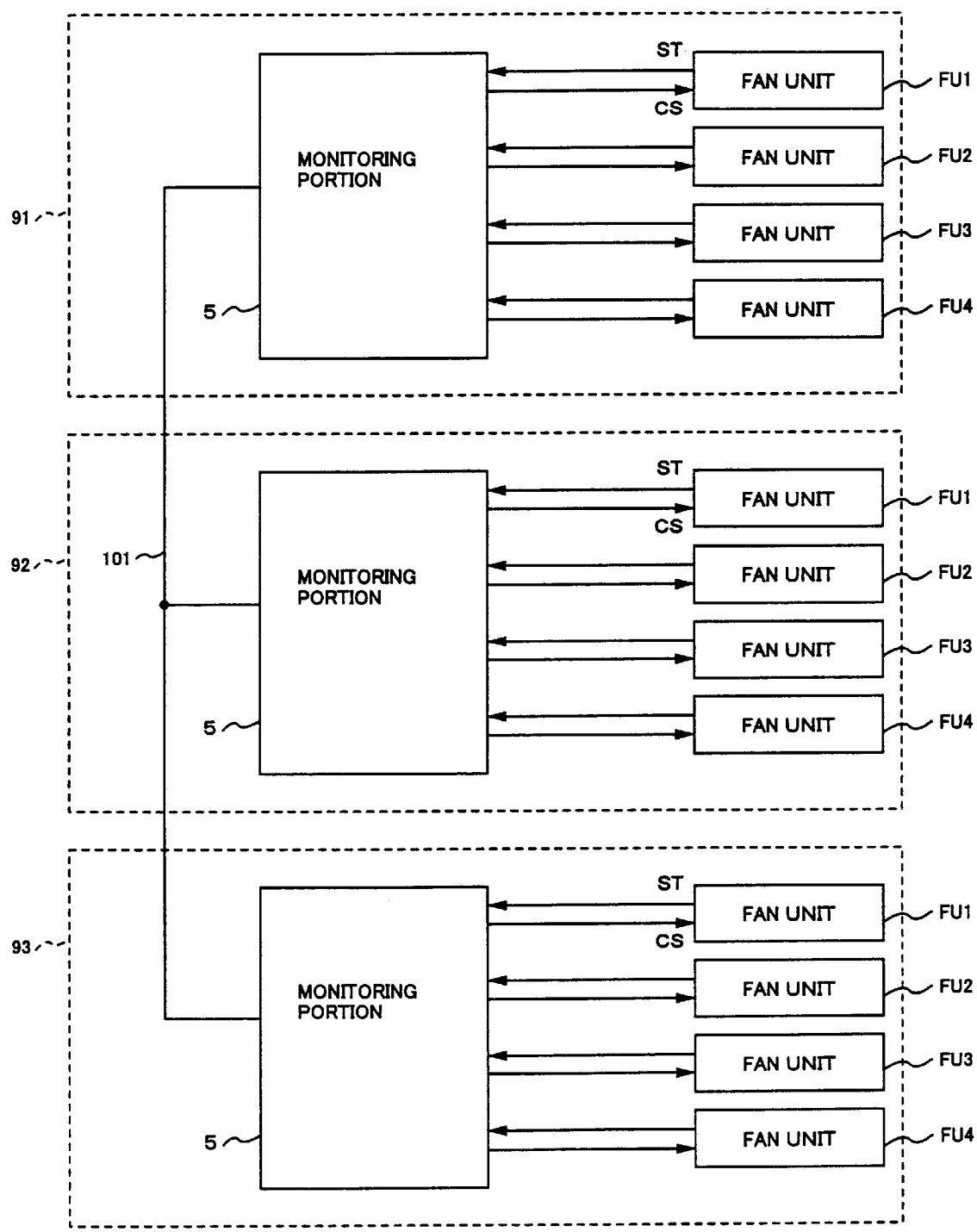
FIG. 28 is a diagram showing a large configuration of the cooling system shown in FIG. 26.

FIG. 28 is a diagram showing a large configuration of the cooling system shown in FIG. 26. As shown in FIG. 28, for example the cooling system includes three cooling apparatuses 91–93 each having a monitoring portion 5 and four fan units FU1–FU4 connected to the monitoring portion 5 respectively. In addition, the bus 101 connects the three monitoring portions 5 to one another. It should be noted that the fan units with an identical reference number in FIG. 28 are stacked at a position.

Hereupon, the fan units FU1–FU4 operate in the same way as the fan units FU1–FU4 described in the first embodiment. Namely, as shown in FIG. 28, the respective fan units FU1–FU4 supply the temperature information ST according to the detected temperature to the monitoring portion 5 and the monitoring portion 5 supplies the corresponding signal CS to the four fan units FU1–FU4.

On the above, the bus 101 connects the fan units with an identical reference number. Namely, the bus 101 consists of four wires that connect the stacked fan units respectively.

Figure 29:
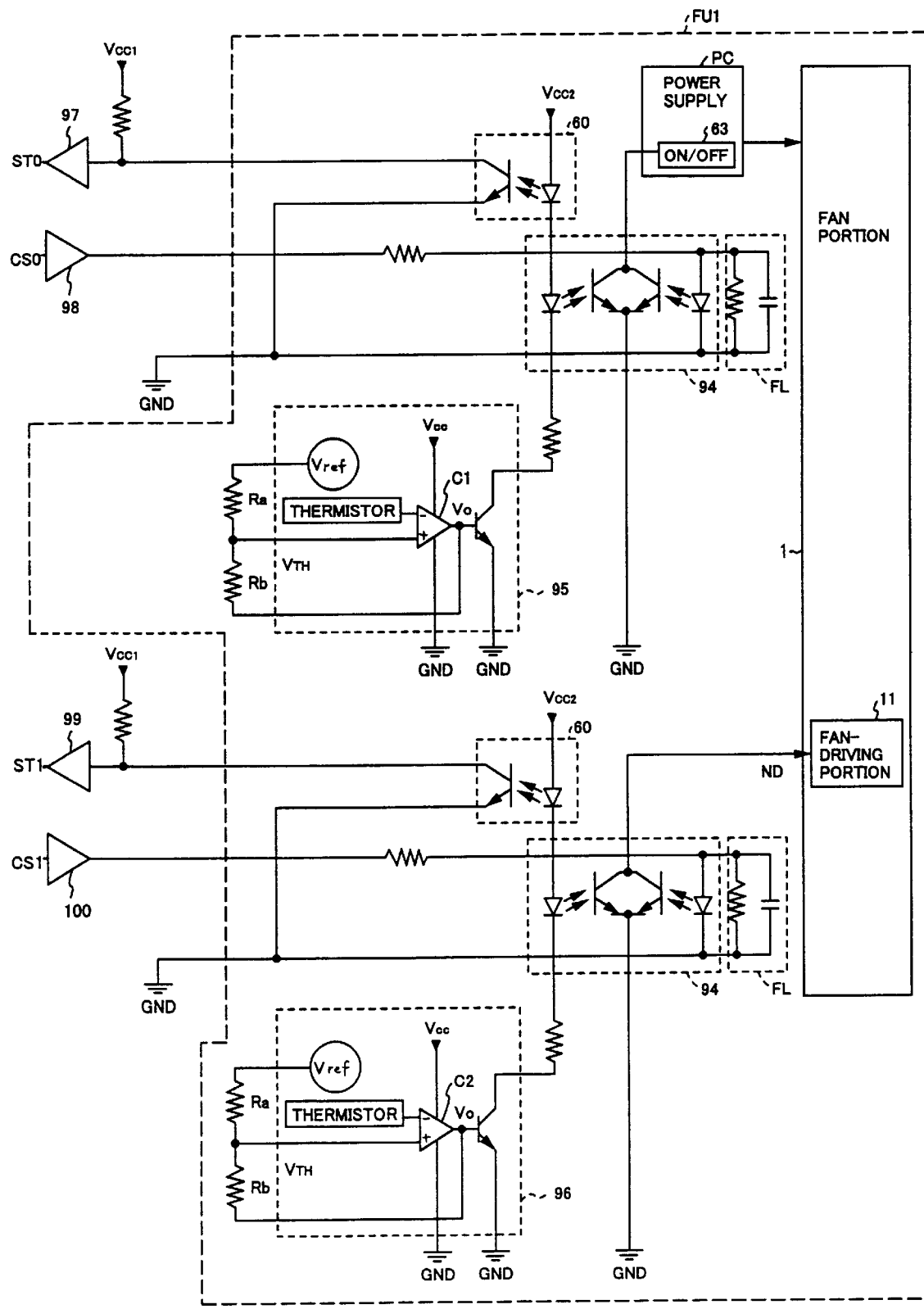
FIG. 29 is a circuit diagram of an interface in the fan unit shown in FIG. 28.

FIG. 29 is a circuit diagram of an interface in the fan unit FU1 shown in FIG. 28. It should be noted that the circuit configurations of the interfaces in the fan units FU2–FU4 shown in FIG. 28 are similar to that of the fan unit FU1. As shown in FIG. 29, the interface includes two temperature sensors 95, 96, switching elements 94 with two photocouplers connected to the temperature sensors 95, 96, buffers 98, 100 and filters FL connected to the switching element 94, a power supply PC connected to the switching element 94, photocouplers 60 connected to the temperature sensors 95, 96 via the switching element 94, buffers 97, 99 connected to the photocoupler 60. It should be noted that the power supply PC is connected to the fan portion 1 and the switching element 94 is connected to the fan-driving portion 11.

Hereupon, each temperature sensor 95, 96 has a comparator C1, C2, a minus terminal of which is connected to a thermistor and a plus terminal of which is supplied with voltage $V_{TH}$ produced by dividing a differential voltage between reference voltage $V_{ref}$ and output node voltage $V_o$ by resistances Ra, Rb.

The above temperature sensor 95 is a circuit for realizing the hysteresis HA shown in FIG. 7, and the temperature sensor 96 is a circuit for realizing the hysteresis HB shown in FIG. 7. It should be noted that the hysterisises HA, HB can be set arbitrarily by varying the resistances Ra, Rb in the temperature sensors 95, 96.

Controlling of the fan between zero and the speed NL depends on the hysteresis HA and is realized by switching a power supply PC of the fan portion 1.

Namely in case that the temperature of the object increases, the comparator C1 outputs the positive output node voltage $V_o$ below temperature T2. Then, the photocoupler in the switching element 94 and the photocoupler 60 are activated. Therefore, the power supply PC switches off and the buffer 97 outputs the signal STO with 0 level as the temperature information ST.

When a polarity of the output node voltage $V_o$ outputted by the comparator C1 becomes negative at the temperature T2, the photocoupler in the switching element 94 and the photocoupler 60 are inactivated. At the time, the power supply PC switches on and the signal STO becomes high level. Therefore, the fan-driving portion 11 in the fan portion 1 drives the fan at the speed NL.

In addition, in case that the temperature of the object decreases, the power supply PC switches off and the speed of the fan becomes zero at the temperature T1.

On the other hand, the hysteresis HB shown in FIG. 7 is referred in case that the fan-driving portion 11 controls the fan between the speed NL and the speed NH according to the control speed ND output from the temperature sensor 96. It should be noted that the power supply PC is under ON-state and the fan is driven at the speed NL as a precondition in this case.

In addition, the comparator C2 outputs the positive output node voltage $V_o$ below temperature T4, whereby the photocoupler in the switching element 94 and the photocoupler 60 are activated. Therefore, the temperature sensor 96 supplies the control speed ND for driving the fan at the speed NL to the fan-driving portion 11, and the buffer 99 outputs the signal ST1 with 0 level as the temperature information ST.

Furthermore, when a polarity on the output node voltage $V_o$ of the comparator C2 becomes negative at the temperature T4, the photocoupler in the switching element 94 and the photocoupler 60 are inactivated. Therefore, the temperature sensor 96 supplies the control speed ND for driving the fan at the speed NH to the fan-driving portion 11, and the signal ST1 becomes high level. The fan-driving portion 11 included in the fan portion 1 drives the fan at the speed NH. It should be noted that the speed of the fan is changed from the speed NH to the speed NL at the temperature T3 in case that the temperature of the object decreases.

On the other hand, in case of controlling the fan units FU1–FU4 coordinatively, the power supply and the control speed ND, being supplied to the fan portion 1, are controlled by the control signals CS0, CS1 that are supplied to the buffers 98, 100 by the monitoring portion 5.

Figure 30:
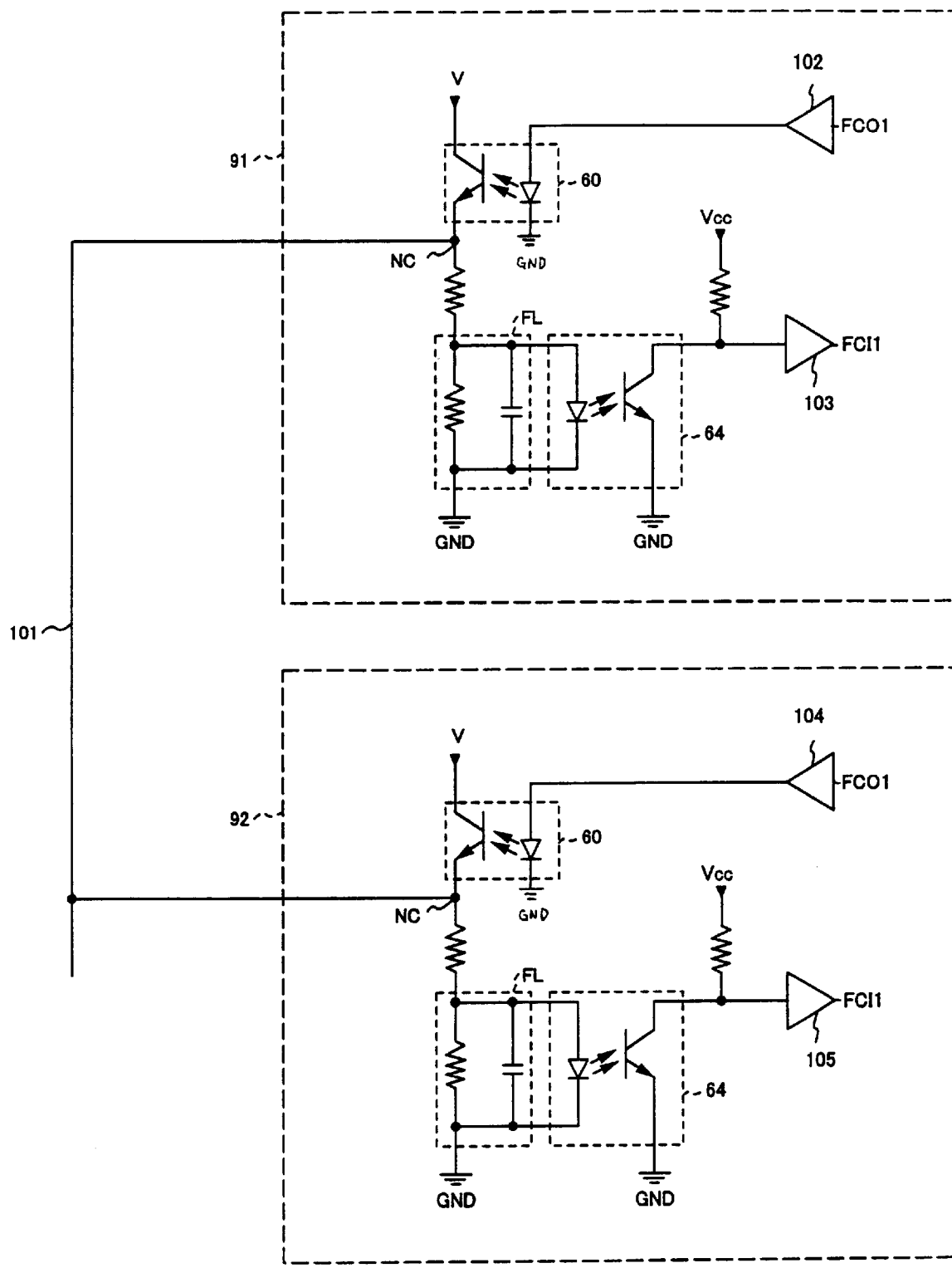
FIG. 30 is a circuit diagram of an interface in the monitoring portion shown in FIG. 28.

FIG. 30 is a circuit diagram of an interface in the monitoring portion 5 shown in FIG. 28. As shown in FIG. 30, the interface in the cooling apparatus 91 includes a photocoupler 60, a buffer 102 connected to the photocoupler 60, a filter FL, a photocoupler 64 connected parallel to the filter FL, a buffer 103 connected to the photocoupler 64. Similarly, the interface in the cooling apparatus 92 includes a photocoupler 60, a buffer 104 connected to the photocoupler 60, a filter FL, a photocoupler 64 connected parallel to the filter FL, a buffer 105 connected to the photocoupler 64.

Hereupon, the respective nodes NC that are between the photocoupler 60 and the filter FL are connected to one another by the bus 101. Therefore, the signals output from the monitoring portion 5 and the signals input to the monitoring portion 5 are transmitted through the bus 101. Namely, it depends on the electric potential whether the respective cooling apparatuses 91, 92, 93 are controlled under the self-control mode or under the coordinative control mode. It should be noted that each cooling apparatus 91, 92 is controlled independently in the self-control mode and is controlled according to an operational state of the other cooling apparatuses in the coordinative control mode.

In addition, the buffers 102, 104 output the control signal FCO1 and the buffer 103, 105 receive the control signal FCI1 through the photocoupler 64.

As mentioned above, the bus 101 includes four wires. Therefore, the four interfaces are arranged in each monitoring portion 5 according to the respective wires. It should be noted that the bus 101 shown in FIG. 30 indicates one of the four wires for convenience.

The following tables show the operations of the cooling system under the coordinative control mode. Namely, the sixth table indicates the operation of the respective cooling apparatuses 91, 92, and the seventh table indicates the operation of the bus 101 in the self-control mode and the coordinative control mode. The eighth table indicates the operation of the cooling apparatus 92 in the coordinative control mode, and the ninth table indicates the operation of the cooling apparatus 93 in the coordinative control mode.

TABLE 6

| | ST0 | | | | ST1 | | | | FCO$_n$ (n = 1 ~ 4) | | | | SPEED | | | |
|---|---|---|---|---|---|---|---|---|---|---|---|---|---|---|---|---|
| CASE | FU1 | FU2 | FU3 | FU4 | FU1 | FU2 | FU3 | FU4 | 1 | 2 | 3 | 4 | FU1 | FU2 | FU3 | FU4 |
| A | 1 | 1 | 1 | 1 | 0 | 0 | 0 | 0 | 0 | 0 | 0 | 0 | N$_L$ | N$_L$ | N$_L$ | N$_L$ |
| B | 1 | 1 | 1 | 1 | 1 | 0 | 0 | 0 | 1 | 0 | 0 | 0 | N$_H$ | N$_L$ | N$_L$ | N$_L$ |
| C | 1 | 1 | 1 | 1 | 0 | 1 | 0 | 0 | 0 | 1 | 0 | 0 | N$_L$ | N$_H$ | N$_L$ | N$_L$ |
| D | 1 | 1 | 1 | 1 | 0 | 0 | 1 | 0 | 0 | 0 | 1 | 0 | N$_L$ | N$_L$ | N$_H$ | N$_L$ |
| E | 1 | 1 | 1 | 1 | 0 | 0 | 0 | 1 | 0 | 0 | 0 | 1 | N$_L$ | N$_L$ | N$_L$ | N$_H$ |

TABLE 7

| | FCO$_n$ | | | | FCI$_n$ | | | | |
|---|---|---|---|---|---|---|---|---|---|
| CASE | 1 | 2 | 3 | 4 | 1 | 2 | 3 | 4 | |
| A | 0 | 0 | 0 | 0 | 1 | 1 | 1 | 1 | self-control state |
| B | 1 | 0 | 0 | 0 | 0 | 1 | 1 | 1 | coordinative control state |
| C | 0 | 1 | 0 | 0 | 1 | 0 | 1 | 1 | coordinative control state |
| D | 0 | 0 | 1 | 0 | 1 | 1 | 0 | 1 | coordinative control state |
| E | 0 | 0 | 0 | 1 | 1 | 1 | 1 | 0 | coordinative control state |

TABLE 8

| | FCI | | | | ST0 | | | | ST1 | | | | SPEED | | | |
|---|---|---|---|---|---|---|---|---|---|---|---|---|---|---|---|---|
| CASE | 1 | 2 | 3 | 4 | FU1 | FU2 | FU3 | FU4 | FU1 | FU2 | FU3 | FU4 | FU1 | FU2 | FU3 | FU4 |
| A | 1 | 1 | 1 | 1 | 1 | 1 | 1 | 1 | 0 | 0 | 0 | 0 | N$_L$ | N$_L$ | N$_L$ | N$_L$ |
| B | 0 | 1 | 1 | 1 | 1 | 1 | 1 | 1 | 0 | 0 | 0 | 0 | N$_H$ | N$_L$ | N$_L$ | N$_L$ |
| C | 1 | 0 | 1 | 1 | 1 | 1 | 1 | 1 | 0 | 0 | 0 | 0 | N$_L$ | N$_H$ | N$_L$ | N$_L$ |
| D | 1 | 1 | 0 | 1 | 1 | 1 | 1 | 1 | 0 | 0 | 0 | 0 | N$_L$ | N$_L$ | N$_H$ | N$_L$ |
| E | 1 | 1 | 1 | 0 | 1 | 1 | 1 | 1 | 0 | 0 | 0 | 0 | N$_L$ | N$_L$ | N$_L$ | N$_H$ |

TABLE 9

| | FCI | | | | ST0 | | | | ST1 | | | | SPEED | | | |
|---|---|---|---|---|---|---|---|---|---|---|---|---|---|---|---|---|
| CASE | 1 | 2 | 3 | 4 | FU1 | FU2 | FU3 | FU4 | FU1 | FU2 | FU3 | FU4 | FU1 | FU2 | FU3 | FU4 |
| A | 1 | 1 | 1 | 1 | 1 | 1 | 1 | 1 | 0 | 0 | 0 | 0 | N$_L$ | N$_L$ | N$_L$ | N$_L$ |
| B | 0 | 1 | 1 | 1 | 1 | 1 | 1 | 1 | 0 | 0 | 0 | 0 | N$_H$ | N$_L$ | N$_L$ | N$_L$ |
| C | 1 | 0 | 1 | 1 | 1 | 1 | 1 | 1 | 0 | 0 | 0 | 0 | N$_L$ | N$_H$ | N$_L$ | N$_L$ |
| D | 1 | 1 | 0 | 1 | 1 | 1 | 1 | 1 | 0 | 0 | 0 | 0 | N$_L$ | N$_L$ | N$_H$ | N$_L$ |
| E | 1 | 1 | 1 | 0 | 1 | 1 | 1 | 1 | 0 | 0 | 0 | 0 | N$_L$ | N$_L$ | N$_L$ | N$_H$ |

As shown in the sixth table, the fan units that output the signal 1 as the signal ST0 and the signal 0 as the signal ST1 operate under the normal temperature, and the fan units that output the signal 1 as the signal ST0 and the signal ST1 operate under the high temperature in the self-control mode. As an example of case B, when the high temperature state is detected in the fan unit FU1, the, fan in the fan unit FU1 is driven at the speed N$_H$ and the control signal FCO1 with high level is transmitted on the bus 101. Then, as shown in the seventh table, the control signal FCI1 supplied to the respective fan units FU1 becomes 0 level.

Hence, as shown in the eighth table, the fan in the fan unit FU1 belonging to the cooling apparatus 92 is driven at the speed N$_H$. Similarly, the fan in the fan unit FU1 belonging to the cooling apparatus 93 is driven at the speed N$_H$ as shown in the ninth table. Namely, the respective fan units FU1–FU4 give priority to the control signal FCIn on the operation thereof.

As described above, the cooling system according to the forth embodiment can realize improvement of reliability and efficiency on the cooling.

The present invention is not limited to the specifically disclosed embodiments, and variations and modifications may be made without departing from the scope of the present invention.

The present application is based on Japanese priority application No. 11-156975 filed on Jun. 3, 1999, the entire contents of which are hereby incorporated by reference.

What is claimed is:

1. A cooling apparatus, comprising:
a plurality of fan units, each fan unit having a fan;
a plurality of temperature sensors which detect a temperature of an object that said cooling apparatus cools, and are included in the respective fan units; and
a control unit which determines the speed of each fan according to the temperature detected by each corresponding temperature sensor in a self-control mode, and increases the speed of at least one of the fans when the speed of another one of the fans is lower than a prescribed threshold in a coordinative control mode.

2. The cooling apparatus as claimed in claim 1, wherein said control unit classifies the fans into a plurality of groups in advance, and increases the speed of at least one of the fans in one of the groups that includes the fan whose speed is lower than said prescribed threshold in said coordinative control mode.

3. The cooling apparatus as claimed in claim 2,
wherein said control unit classifies the fans that are arranged within a prescribed distance from one of the fans as one of said groups.

4. The cooling apparatus as claimed in claim 2,
wherein when any one of said fan units is removed from said cooling apparatus in said coordinative control mode, said control unit maintains the speed on all other fans in one of the groups that includes the removed fan unit.

5. The cooling apparatus as claimed in claim 4,
wherein said control unit releases said coordinative control mode when a new fan unit is attached to the cooling apparatus as a substitute for said removed fan unit, and determines each speed on all the other fans in one of the groups that includes the fan of said new fan unit according to the temperature detected by the corresponding temperature sensor in said self-control mode.

6. The cooling apparatus as claimed in claim 1,
wherein each of the fans is set at a distance from said object that said cooling apparatus cools, according to the performance of the fan.

7. The cooling apparatus as claimed in claim 1, wherein said control unit includes;
a monitoring unit for monitoring operating states of said plurality of fan units; and
a plurality of fan-control units, corresponding respectively to the fan units for controlling the corresponding fan,
wherein each of said plurality of fan-control units decides a control mode of the fan according to a control signal supplied from said monitoring unit, and drives said corresponding fan at an optimum speed under the temperature detected by the corresponding temperature sensor.

8. The cooling apparatus as claimed in claim 7,
wherein each of said plurality of fan-control units includes a storage unit that stores a self-control table indicating the optimum speed in the self-control mode on a temperature-specific basis and a coordinative control table indicating the optimum speed in the coordinative control mode on a temperature-specific basis.

9. The cooling apparatus as claimed in claim 8,
wherein said optimum speed in said self-control table form step functions to the temperatures.

10. The cooling apparatus as claimed in claim 8,
wherein said optimum speed in said self-control table form linear functions to the temperatures.

11. The cooling apparatus as claimed in claim 7, wherein said fan control unit includes a trouble-detecting unit that detects any trouble of the fan by comparing an actual speed with said threshold that varies according to the optimum speed; and
said monitoring unit sets the prescribed plurality of fan units into said coordinative control mode when said trouble-detecting portion detects said any trouble.

12. The cooling apparatus as claimed in claim 11,
wherein said threshold is a constant around the temperature at which the optimum speed changes.

13. The cooling apparatus as claimed in claim 11, wherein said fan control unit further includes:
a first setting means for setting a first fan unit, which includes the fan whose trouble is detected by said trouble-detecting unit, to said coordinative control mode when said trouble-detecting unit detects the trouble;
a second setting means for setting said first fan unit to said coordinative control mode when said trouble-detecting unit detects the trouble of the fan in a second fan unit; and
a control terminal that is arranged between said first setting means and said second setting means.

14. A cooling system comprising:
a first fan for supplying air to an object that said cooling system cools, said first fan is included in a first cooling apparatus;
a second fan for exhausting the air that takes heat from the object, said second fan being arranged in an opposite direction as said first fan is from the object, said second fan is included in a second cooling apparatus; and
an adjusting means for adjusting a flow of the air between said first fan and said second fan,
wherein said first cooling apparatus and said second cooling apparatus each further include:
a plurality of fan units, each fan unit having a fan;
a plurality of temperature sensors detecting temperature of the object, and are included in said respective fan units; and
a control unit which determines the speed of said fan according to the temperature detected by said sensors in a self-control mode and increases the speed of at least one of the fans when the speed of any one of the fans is lower than a prescribed threshold in a coordinative control mode.

15. The cooling system as claimed in claim 14, wherein:
said control unit in said first cooling apparatus and said control unit in said second cooling apparatus are connected to each other; and
said control unit in said first cooling apparatus and said control unit in said second cooling apparatus control corresponding fans according to the signal supplied from another control unit.

* * * * *